US010683427B2

(12) United States Patent
Umebayashi

(10) Patent No.: US 10,683,427 B2
(45) Date of Patent: Jun. 16, 2020

(54) INK JET RECORDING METHOD AND INK JET RECORDING DEVICE

(71) Applicant: FUJIFILM CORPORATION, Minato-ku, Tokyo (JP)

(72) Inventor: Tsutomu Umebayashi, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 16/000,899

(22) Filed: Jun. 6, 2018

(65) Prior Publication Data

US 2018/0282559 A1    Oct. 4, 2018

Related U.S. Application Data

(63) Continuation of application No. PCT/JP2016/087685, filed on Dec. 16, 2016.

(30) Foreign Application Priority Data

Dec. 18, 2015   (JP) .................................. 2015-248004

(51) Int. Cl.
*C09D 11/30* (2014.01)
*B41M 5/00* (2006.01)
(Continued)

(52) U.S. Cl.
CPC ............ *C09D 11/30* (2013.01); *B41J 2/2114* (2013.01); *B41M 5/00* (2013.01); *C09D 11/54* (2013.01)

(58) Field of Classification Search
CPC .................................................. C09D 11/36
See application file for complete search history.

(56) References Cited

U.S. PATENT DOCUMENTS

2004/0032473 A1   2/2004 Ishimoto et al.
2006/0158493 A1*  7/2006 Nakano ................ C09D 11/101
                                                          347/96
(Continued)

FOREIGN PATENT DOCUMENTS

CN       1464841 A     12/2003
CN    101333354 A     12/2008
(Continued)

OTHER PUBLICATIONS

English language translation of the following: Office action dated Mar. 5, 2019 from the JPO in a Japanese patent application No. 2017-556488 corresponding to the instant patent application.
(Continued)

*Primary Examiner* — Shelby L Fidler
(74) *Attorney, Agent, or Firm* — Solaris Intellectual Property Group, PLLC

(57) ABSTRACT

Provided are an ink jet recording method including a colored ink jetting step of jetting a colored ink including a coloring agent and an organic solvent from an ink jet head onto a recording medium, a colored ink heating step of heating the colored ink jetted onto the recording medium by maintaining a surface temperature of the recording medium at 40° C. or higher, a colorless ink jetting step of jetting a colorless ink including a polymerizable compound, a photopolymerization initiator, and an organic solvent from the ink jet head onto the colored ink after the heating, a colorless ink heating step of heating the colorless ink jetted onto the colored ink after the heating by maintaining the surface temperature of the recording medium at 40° C. or higher, and a colorless ink curing step of curing the colorless ink by irradiating the heated colorless ink with an active energy ray and an ink jet recording device.

12 Claims, 2 Drawing Sheets

(51) Int. Cl.
*C09D 11/54* (2014.01)
*B41J 2/21* (2006.01)

(56) References Cited

U.S. PATENT DOCUMENTS

| | | | |
|---|---|---|---|
| 2009/0035535 A1 | 2/2009 | Wachi et al. | |
| 2011/0181675 A1 | 7/2011 | Takemoto | |
| 2012/0075394 A1 | 3/2012 | Ohnishi | |
| 2012/0206534 A1* | 8/2012 | Fassam | B41J 11/002 347/20 |
| 2015/0103116 A1 | 4/2015 | Gotou | |
| 2015/0184010 A1 | 7/2015 | Okada et al. | |
| 2015/0246556 A1* | 9/2015 | Houjou | B41J 11/002 347/16 |
| 2018/0291218 A1* | 10/2018 | Umebayashi | B41J 2/01 |
| 2019/0023928 A1* | 1/2019 | Kamada | C09D 11/101 |

FOREIGN PATENT DOCUMENTS

| | | |
|---|---|---|
| JP | S56-118877 A | 9/1981 |
| JP | H11-277725 A | 10/1999 |
| JP | 2009-148904 A | 7/2009 |
| JP | 2010-280828 A | 12/2010 |
| JP | 2011-63735 A | 3/2011 |
| JP | 2011-173405 A | 9/2011 |
| JP | 2012-101492 A | 5/2012 |
| JP | 2013-502480 A | 1/2013 |
| JP | 2013-180436 A | 9/2013 |
| JP | 2014-172224 A | 9/2014 |
| JP | 2015-48387 A | 3/2015 |
| JP | 2015-74120 A | 4/2015 |
| JP | 2015-74184 A | 4/2015 |
| JP | 2015-124271 A | 7/2015 |
| JP | 2015-147418 A | 8/2016 |

OTHER PUBLICATIONS

International Search Report issued in International Application No. PCT/JP2016/087685 dated Feb. 7, 2017.
Written Opinion of the ISA issued in International Application No. PCT/JP2016/087685 dated Feb. 7, 2017.
Extended European Search Report dated Sep. 12, 2018, issued in corresponding EP Patent Application No. 16875819.1.
Office Action dated Dec. 11, 2018, issued by the JPO in corresponding Japanese Patent Application No. 2017-556488.
English language translation of the following: Office action dated Jun. 3, 2019 from the SIPO in a Chinese patent application No. 201680073465.7 corresponding to the instant patent application.
Office action dated Dec. 24, 2019 from the IPO in a Indian patent application No. 201847022037 corresponding to the instant patent application.

* cited by examiner

INK JET RECORDING METHOD AND INK JET RECORDING DEVICE

CROSS-REFERENCE TO RELATED APPLICATIONS

This application is a continuation application of International Application No. PCT/JP2016/087685, filed Dec. 16, 2016, the disclosure of which is incorporated herein by reference in its entirety. Further, this application claims priority from Japanese Patent Application No. 2015-248004, filed Dec. 18, 2015, the disclosure of which is incorporated herein by reference in its entirety.

BACKGROUND OF THE INVENTION

1. Field of the Invention

The present disclosure relates to an ink jet recording method and an ink jet recording device.

2. Description of the Related Art

In an ink jet recording method, an apparatus therefor is inexpensive, a plate is not necessary in a case of recording, an ink can be efficiently used, since direct image formation is performed on a recording medium by jetting the ink only onto a required image area, and running cost is particularly low in a case of small lot production. In addition, the ink jet recording method has recently been attracting attention, since less noise is generated, and the method is excellent as an image recording method.

Examples of the ink used in the ink jet recording method include a solvent-type ink (hereinafter, also referred to as a SOL ink), an ultraviolet curable-type ink (hereinafter, also referred to as a UV ink), and the like. The SOL ink is an ink obtained by dispersing mainly a coloring agent and a binder resin in an organic solvent, and recording of an image on a recording medium is performed by jetting the SOL ink from an ink jet head onto the recording medium and volatilizing the organic solvent using a heater or the like.

On the other hand, the UV ink is an ink mainly including a coloring agent, a polymerizable compound (generally a monomer), and a polymerization initiator, and recording of an image on a recording medium is performed by jetting the UV ink from an ink jet head onto the recording medium and then curing the ink by irradiation with an active energy ray.

Various methods for recording an image and recording devices using these inks have been proposed.

For example, as a method for obtaining a printed article by laminating ink layers, an ink jet printing method including a second ink layer forming step of jetting an ultraviolet curable-type ink as a second ink onto a first ink layer formed on a recording medium and drying the second ink to form a second ink layer and a third ink layer forming step of jetting a clear ink as a third ink onto the second ink layer and drying the third ink to form a third ink layer, in which drying time during the second ink layer forming step is shorter than drying time during the third ink layer forming step has been proposed (for example, refer to JP2015-074120A).

In addition, as an ink jet recording method, a method for manufacturing a printed article including performing first printing on a surface of a medium to be printed, which has no ink-absorption property, by jetting ink droplets having ultraviolet curing properties from a recording head of an ink jet system onto the surface to be printed on in a state where the surface to be printed on is heated, performing heating, superimposing second printing on the first printing by jetting the ink droplets having ultraviolet curing properties from the recording head of the ink jet system onto the first print, and irradiating a surface to be recorded and printed on with an ultraviolet ray has been proposed (for example, refer to JP1999-277725A (JP-H11-277725A)).

As an ink jet recording device, an ink jet recording device including image forming means including a plurality of nozzle rows which are provided to correspond to a plurality of inks that are curable by irradiation of an actinic ray and have different curing characteristics and which have a plurality of nozzles arranged for jetting the inks, jetting control means which controls jetting of the ink from the image forming means with respect to each of divided units obtained by dividing the nozzle rows into a plurality of units, so as to form layers on a recording medium by the inks jetted from the respective divided units in such a manner that a plurality of the layers that are formed by the inks jetted from the different divided units are laminated on each other, and actinic ray irradiation means which irradiates the actinic ray onto the inks that have been jetted onto the recording medium has been proposed (for example, refer to JP2012-101492A).

Furthermore, as another ink jet recording device, an ink jet printer including an ink jet head for spraying an ink containing a pigment, an ultraviolet curable resin, a photopolymerization initiator, and a volatile organic solvent from a plurality of jetting ports to cause ink droplets to land on the surface of the medium, heating means which is positioned on at least one of a rear surface side or a front surface side of the medium and provided to heat the ink droplets landed on the surface of the medium to remove the volatile organic solvent contained in the ink droplets by volatilization, and UV irradiation means for irradiating the ink droplets on the surface of the medium from which the volatile organic solvent has been removed by volatilization with an ultraviolet ray to cure the ink droplets has been proposed (for example, refer to JP2010-280828A).

SUMMARY OF THE INVENTION

In a case where the UV ink is used, an image that is obtained has excellent abrasion resistance, however, bending properties thereof tend to be inferior, and thus compatibility between abrasion resistance and bending properties tend not to be achieved.

Here, "bending properties are inferior" means that an image cannot follow curving and deformation (bending) of the recording medium on which the image is formed, and a crack is easily generated on the image. That is, "having excellent bending properties" means that a crack is not easily generated on the image in the case of the bending of the recording medium on which the image is formed.

In particular, in a case where the ink layers are laminated as in JP2015-074120A, bending properties of the entire laminated ink layers tend to be inferior, and compatibility between abrasion resistance and bending properties tend not to be achieved, in a case where the layer formed of the ultraviolet curable-type ink (that is, a UV ink) is included. In addition, even in a case where the ink jet recording method described in JP1999-277725A (JP-H11-277725A) is used, compatibility between abrasion resistance and bending properties tend not to be achieved, since the ink having ultraviolet curing properties (that is, a UV ink) is used.

Furthermore, the ink jet recording device described in JP2012-101492A is a device that uses the ink that is curable by irradiation of an actinic ray (that is, a UV ink), and compatibility between abrasion resistance and bending properties also tend not to be achieved in an image formed using this device.

On the other hand, in a case where the SOL ink is used, the image that is obtained has excellent bending properties, however, abrasion resistance tends to be inferior, and thus compatibility between abrasion resistance and bending properties tend not to be achieved.

Even in an image formed using the ink containing the pigment, the ultraviolet curable resin, the photopolymerization initiator, and the volatile organic solvent, as in the case of the ink jet printer described in JP2010-280828A, abrasion resistance is required to be further improved.

The present invention has been made in view of the above circumstances, and an object of one embodiment of the present invention is to provide an ink jet recording method for forming an image having excellent abrasion resistance and bending properties. An object of another embodiment of the present invention is to provide an ink jet recording device for forming an image having excellent abrasion resistance and bending properties.

Specific aspects for achieving the above objects include the following aspects.

<1> An ink jet recording method comprising: a colored ink jetting step of jetting a colored ink including a coloring agent and an organic solvent from an ink jet head onto a recording medium; a colored ink heating step of heating the colored ink jetted onto the recording medium by maintaining a surface temperature of the recording medium at 40° C. or higher; a colorless ink jetting step of jetting a colorless ink including a polymerizable compound, a photopolymerization initiator, and an organic solvent from the ink jet head onto the colored ink after the heating; a colorless ink heating step of heating the colorless ink jetted onto the colored ink after the heating by maintaining the surface temperature of the recording medium at 40° C. or higher; and a colorless ink curing step of curing the colorless ink by irradiating the colorless ink after the heating with an active energy ray.

<2> The ink jet recording method according to <1>, in which the colored ink further includes a polymer having a weight-average molecular weight of 20,000 to 100,000 in an amount of 2% by mass or higher with respect to a total mass of the colored ink.

<3> The ink jet recording method according to <1> or <2>, further comprising, after the colored ink heating step and before the colorless ink jetting step: a colored ink curing step of curing the colored ink by irradiating the colored ink after the heating with the active energy ray, in which the colored ink further includes a polymerizable compound and a photopolymerization initiator.

<4> The ink jet recording method according to <3>, in which the colored ink includes, as the polymerizable compound, an acrylate compound having a weight-average molecular weight of 1,000 to 30,000 in an amount of 15% by mass to 30% by mass with respect to a total mass of the colored ink.

<5> The ink jet recording method according to <3> or <4>, in which the polymerizable compound included in the colored ink includes at least one kind of an acrylate compound, and a total mass of a monofunctional acrylate compound and a bifunctional acrylate compound with respect to a total mass of the polymerizable compound is 50% by mass or higher.

<6> The ink jet recording method according to any one of <1> to <5>, in which the polymerizable compound included in the colorless ink includes at least one kind of an acrylate compound, and a total mass of a monofunctional acrylate compound and a bifunctional acrylate compound with respect to a total mass of the polymerizable compound is 30% by mass or higher.

<7> The ink jet recording method according to any one of <1> to <6>, in which the colorless ink further includes acrylic modified polyorganosiloxane having a weight-average molecular weight of 20,000 to 400,000 in an amount of 0.1% by mass to 5% by mass with respect to a total mass of the colorless ink.

<8> The ink jet recording method according to any one of <1> to <7>, in which an amount of the organic solvent included in the colorless ink is 50% by mass to 85% by mass with respect to a total mass of the colorless ink.

<9> The ink jet recording method according to any one of <1> to <8>, in which a boiling point of the organic solvent included in the colorless ink is 150° C. to 250° C.

<10> The ink jet recording method according to any one of <1> to <9>, in which a boiling point Tbp (T) of the organic solvent included in the colorless ink and a boiling point Tbp (C) of the organic solvent included in the colored ink satisfy a relationship of Expression (1).

$$\text{Tbp}(C) \leq \text{Tbp}(T) \quad \text{Expression (1)}$$

<11> The ink jet recording method according to any one of <1> to <10>, in which surface tension γ (C) of the colored ink and surface tension γ (T) of the colorless ink at a temperature of 25° C. satisfy a relationship of Expression (2).

$$\gamma(T) \leq \gamma(C) \quad \text{Expression (2)}$$

<12> The ink jet recording method according to any one of <1> to <11>, in which the heating in the colored ink heating step is performed for one minute or longer by maintaining the surface temperature of the recording medium at 40° C. to 100° C.

<13> The ink jet recording method according to <12>, in which the heating in the colored ink heating step is performed for 5 seconds or longer.

<14> An ink jet recording device which performs the ink jet recording method according to any one of <1> to <13>, the device comprising: a colored ink jetting portion which jets the colored ink onto the recording medium; a colored ink heating portion which heats the colored ink jetted onto the recording medium by maintaining the surface temperature of the recording medium at 40° C. or higher; a colorless ink jetting portion which jets the colorless ink onto the colored ink after the heating; a colorless ink heating portion which heats the colorless ink jetted onto the colored ink after the heating by maintaining the surface temperature of the recording medium at 40° C. or higher; and an irradiation portion for curing a colorless ink which performs irradiation with an active energy ray for curing the colorless ink after the heating.

<15> The ink jet recording device according to <14>, further comprising: an irradiation portion for curing a colored ink which performs irradiation with an active energy ray for curing the colored ink after the heating.

According to one embodiment of the present invention, an ink jet recording method for forming an image having excellent abrasion resistance and bending properties is provided. According to another embodiment of the present invention, an ink jet recording device is provided.

DESCRIPTION OF THE PREFERRED EMBODIMENTS

Figure 1:
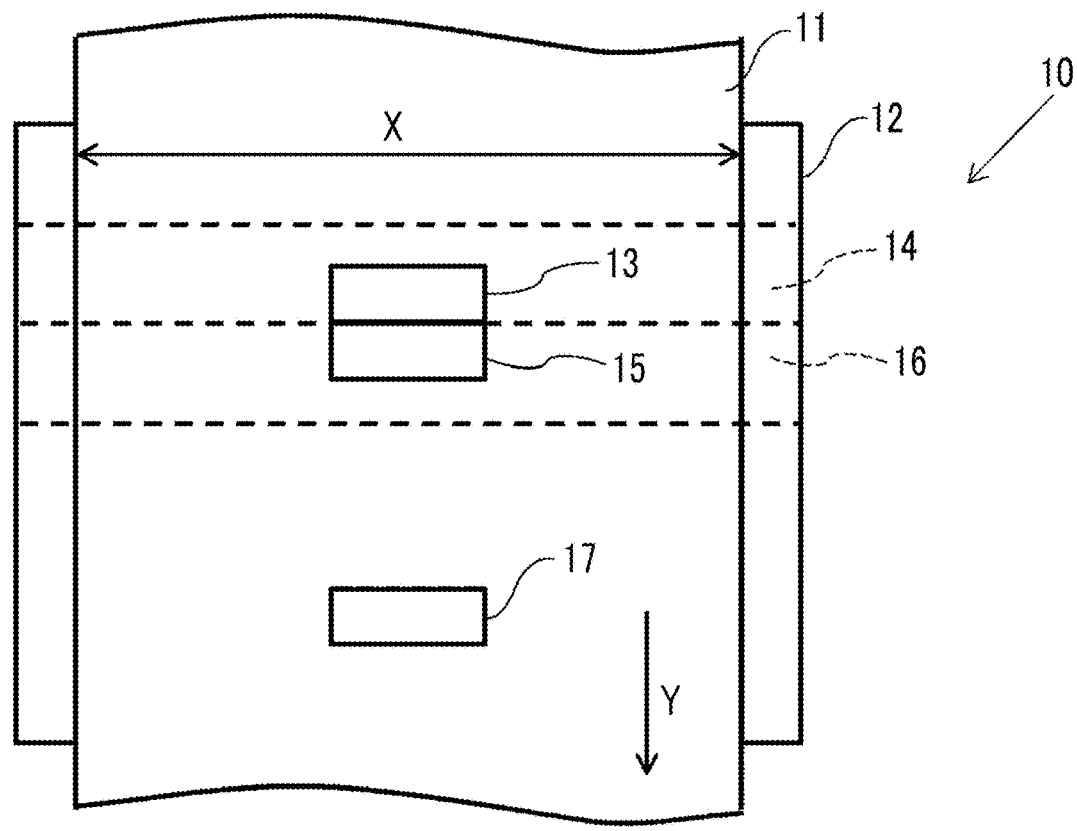
FIG. 1 is a schematic top view of main portions of a shuttle system ink jet recording device.

Hereinafter, an ink jet recording method and ink jet recording device of the present disclosure will be described in detail.

In the present specification, a numerical range expressed using "to" indicates a range including numerical values denoted before and after "to" as a minimum value and a maximum value, respectively.

In the present specification, an "image" means a laminate on a recording medium, which is obtained by laminating a colored ink and a cured colorless ink.

<Ink Jet Recording Method>

The ink jet recording method includes a colored ink jetting step of jetting a colored ink including a coloring agent and an organic solvent from an ink jet head onto a recording medium, a colored ink heating step of heating the colored ink jetted onto the recording medium and removing the organic solvent included in the colored ink, a colorless ink jetting step of jetting a colorless ink including a polymerizable compound, a photopolymerization initiator, and an organic solvent from the ink jet head onto the colored ink after the heating, a colorless ink heating step of heating the colorless ink jetted onto the colored ink after the heating and removing the organic solvent included in the colorless ink, and a colorless ink curing step of curing the colorless ink by irradiating the colorless ink after the heating with an active energy ray.

The reason for the effect exhibited by the ink jet recording method is not clear, however, the reason is presumed to be as follows.

In an ink jet recording method of the related art in which a UV ink and a SOL ink are used, an image excellent in any one of bending properties and abrasion resistance can be formed, however, forming an image of which bending properties and abrasion resistance are compatible with each other has been difficult. In an ink jet recording method using an ink described in JP2010-280828A, abrasion resistance is not sufficient in uses that highly require abrasion resistance (for example, uses in image forming on leather items such as a seat sheet for a car and a bag), and thus, further improvement in abrasion resistance has been required.

The ink jet recording method of the present disclosure includes the colored ink jetting step, the colored ink heating step, the colorless ink jetting step, the colorless ink heating step, and the colorless ink curing step, as described above.

Therefore, by heating the colored ink after jetting the colored ink onto the recording medium and removing (a part or all of) the organic solvent included in the colored ink, remaining of the organic solvent in the colored ink is suppressed. Thus, an image that is formed has excellent abrasion resistance. Furthermore, after undergoing the heating step after the jetting of the colorless ink, the colorless ink is cured by the active energy ray, and thus, a curing reaction sufficiently proceeds, and an image which has excellent abrasion resistance is formed, while maintaining bending properties thereof.

It is considered that the image thus formed has excellent bending properties and abrasion resistance for the above reasons.

In addition, the image that is formed by the ink jet recording method also has excellent chemical resistance, since the curing reaction of the colorless ink sufficiently proceeds.

Hereinafter, each step in the ink jet recording method will be described, and then each component of the colored ink and the colorless ink will be described in detail.

[Colored Ink Jetting Step]

The ink jet recording method includes the colored ink jetting step of jetting the colored ink including the coloring agent and the organic solvent from the ink jet head onto the recording medium.

In the ink jet recording method, it is possible to form a desired image by applying the colored ink and the colorless ink which will be described below onto the recording medium.

The colored ink is not particularly limited as long as the colored ink is an ink including a coloring agent and an organic solvent, and the colored ink may be an ink including a coloring agent, an organic solvent, and a polymer (that is, a colored SOL ink) or may be an ink including a coloring agent, an organic solvent, a polymerizable compound, and a photopolymerization initiator (that is, a colored SUV ink). The colored SUV ink may further include a polymer.

A content of the organic solvent in the colored ink is preferably 40% by mass or higher and more preferably 50% by mass or higher, with respect to the total mass of the colored ink.

In a case where the colored ink is the colored SOL ink, the content of the organic solvent is preferably 70% by mass to 95% by mass and more preferably 80% by mass to 93% by mass, with respect to the total mass of the colored ink.

In a case where the content of the organic solvent in the colored SOL ink is 70% by mass or higher, jettability of the colored SOL ink is excellent. Meanwhile, in a case where the content of the organic solvent is 95% by mass or lower, bleeding of the colored SOL ink is suppressed.

In a case where the colored ink is the colored SUV ink, the content of the organic solvent is preferably 50% by mass to 90% by mass and more preferably 60% by mass to 85% by mass with respect to the total mass of the colored ink.

In a case where the content of the organic solvent in the colored SUV ink is 50% by mass or higher, jettability of the colored SUV ink is excellent. Meanwhile, in a case where the content of the organic solvent is 95% by mass or lower, bleeding of the colored SUV ink is suppressed.

The colored ink may include at least one kind of the polymer. In a case where the colored ink includes the polymer, the polymer functions as a binder that allows the components included in the colored ink, such as the coloring agent, to be retained. In particular, the polymer serves as the binder in a case where the colored ink is the colored SOL ink.

In a case where the colored ink includes the polymer, a content of the polymer is preferably 2% by mass or higher, more preferably 2% by mass to 10% by mass, and even more preferably 5% by mass to 7% by mass, with respect to the total mass of the colored ink.

In a case where the content of the polymer is 2% by mass or higher, the function as the binder is easily realized. Meanwhile, in a case where the content of the polymer is 10% by mass or lower, jettability of the colored ink is further improved.

A weight-average molecular weight of the polymer is preferably 10,000 to 150,000, more preferably 15,000 to 120,000, and even more preferably 20,000 to 100,000.

In a case where the weight-average molecular weight of the polymer is 10,000 or greater, the function as the binder is easily realized. Meanwhile, in a case where the weight-average molecular weight of the polymer is 150,000 or smaller, jettability of the colored ink is further improved.

The weight-average molecular weight of the polymer refers to a value measured by gel permeation chromatography (GPC).

GPC is performed by using HLC-8020GPC (manufactured by TOSOH CORPORATION), using three TSKgel (registered trademark), Super Multipore HZ-H (manufactured by TOSOH CORPORATION, 4.6 mmID×15 cm) as a column, and using tetrahydrofuran (THF) as an eluent.

Furthermore, GPC is performed by setting a sample concentration to 0.45% by mass, a flow rate to 0.35 ml/min, a sample injection volume to 10 µl, and a measurement temperature to 40° C. and by using a differential refractive index (RI) detector.

A calibration curve is created from 8 samples of "standard sample TSK standard, polystyrene" manufactured by TOSOH CORPORATION: "F-40", "F-20", "F-4", "F-1", "A-5000", "A-2500", "A-1000", and "n-propylbenzene".

In a case where the colored ink includes the polymer, it is preferable to include the polymer having a weight-average molecular weight of 10,000 to 150,000 in an amount of 2% by mass or higher with respect to the total mass of the colored ink, and it is more preferable to include the polymer having a weight-average molecular weight of 20,000 to 100,000 in an amount of 2% by mass or higher with respect to the total mass of the colored ink.

[Colored Ink Heating Step]

The ink jet recording method includes the colored ink heating step of heating the colored ink jetted onto the recording medium by maintaining a surface temperature of the recording medium at 40° C. or higher.

By including the colored ink heating step in the ink jet recording method, at least a part of the organic solvent included in the colored ink is removed. Thus, an image which has excellent abrasion resistance and of which bleeding and dulling is suppressed is formed.

In the colored ink heating step, it is preferable that the organic solvent is quickly removed after droplets of the colored ink land on the recording medium, from the viewpoint of further suppressing bleeding and dulling of the image that is formed. Specifically, time that is taken from the landing of the colored ink on the recording medium to initiation of the heating is preferably 1 second or shorter and more preferably 0.5 seconds or shorter, and it is even more preferable that the heating is simultaneously performed with the landing.

It is preferable that, in the colored ink heating step, the organic solvent is removed such that an amount of the organic solvent included in the colored ink reaches 10% by mass or lower with respect to the total mass of the colored ink, it is more preferable that the organic solvent is removed such that the amount of the organic solvent reaches 3% by mass or lower with respect to the total mass of the colored ink, and it is even more preferable that the organic solvent is removed such that the amount of the organic solvent reaches 0% by mass (that is, all of the organic solvent is removed) with respect to the total mass of the colored ink.

In the colored ink heating step, a boiling point of the organic solvent is preferably 220° C. or lower, more preferably 200° C. or lower, and even more preferably 180° C. or lower, from the viewpoint of a removal rate of the organic solvent included in the colored ink.

The boiling point of the organic solvent can be measured using a known method. For example, the measurement can be performed according to JIS K2254.

The heating in the colored ink heating step is preferably performed for 1 second or longer by maintaining the surface temperature of the recording medium at 40° C. to 100° C.

The surface temperature of the recording medium refers to a temperature of a surface of the recording medium on which an image is formed.

The surface temperature of the recording medium can be measured by an infrared radiation thermometer (AD-5616, manufactured by A&D Company, Limited).

In a case where a heating temperature in the colored ink heating step is 40° C. or higher, the organic solvent included in the colored ink is easily removed, and bleeding and dulling of the image can be suppressed. Meanwhile, in a case where the heating temperature is 100° C. or lower, deformation of the recording medium can be suppressed.

From the above viewpoints, the heating temperature is preferably 50° C. to 100° C.

In a case where heating time in the colored ink heating step is 1 second or longer, the organic solvent included in the colored ink is easily removed, and bleeding and dulling of the image can be suppressed.

From the above viewpoints, the heating is preferably performed for 5 seconds or longer, more preferably performed for 5 seconds to 20 seconds, and even more preferably performed for 5 seconds to 15 seconds.

In a case where the heating time is 20 seconds or shorter, deformation of the recording medium can be suppressed.

The heating temperature and the heating time in the colored ink heating step may be adjusted according to the boiling point of the organic solvent included in the colored ink, the content of the organic solvent, and a transport speed of the recording medium.

[Colored Ink Curing Step]

In a case where the colored ink includes the polymerizable compound and the photopolymerization initiator, the ink jet recording method may include a colored ink curing step of curing the colored ink by irradiating the colored ink after the heating with an active energy ray, after the colored ink heating step and before the colorless ink jetting step.

In a case where the colored ink includes the polymerizable compound, a polymerization reaction of the polymerizable compound proceeds, and the colored ink is cured by the colored ink curing step, and thus, an image having more excellent abrasion resistance is obtained.

It is preferable that the polymerizable compound that can be included in the colored ink is an oligomer having a weight-average molecular weight of 1,000 to 30,000.

In the present specification, the oligomer refers to a polymerizable compound having a weight-average molecular weight of 1,000 to 30,000. In addition, a monomer refers to a polymerizable compound having a weight-average molecular weight that is smaller than 1,000.

By setting the weight-average molecular weight of the oligomer within the above range, viscosity of the colored ink including the oligomer does not become excessively high, and jettability of the colored ink is excellent.

Furthermore, by including the oligomer having a weight-average molecular weight within the above range in the colored ink and curing the colored ink, a weight-average molecular weight of a structural unit derived from the oligomer in the colored ink after the curing is greater than a weight-average molecular weight of a structural unit derived from the monomer in a case where a colored ink including the monomer is cured. Therefore, the image has more excellent bending properties.

From the above viewpoints, the weight-average molecular weight of the oligomer is more preferably 1,500 to 10,000 and even more preferably 3,000 to 5,000.

In a case where the colored ink includes the polymerizable compound, a content of the polymerizable compound is preferably 15% by mass to 30% by mass and more preferably 18% by mass to 28% by mass, with respect to the total mass of the colored ink.

In a case where the content of the polymerizable compound in the colored ink is within the above range, balance between bending properties and abrasion resistance becomes favorable, and compatibility between bending properties and abrasion resistance can be achieved at a higher level.

It is preferable that the polymerizable compound that can be included in the colored ink is an acrylate compound, and it is more preferable that the acrylate compound is an oligomer. In a case where the polymerizable compound is the acrylate compound, an image having more excellent abrasion resistance can be obtained.

The polymerizable compound that can be included in the colored ink is preferably an acrylate compound (that is, an acrylate oligomer) having a weight-average molecular weight of 1,000 to 30,000, and a content of the acrylate compound is preferably 15% by mass to 30% by mass with respect to the total mass of the colored ink.

By including the acrylate compound having a weight-average molecular weight of 1,000 to 30,000 at a content of 15% by mass to 30% by mass with respect to the total mass of the colored ink, balance between bending properties and abrasion resistance becomes favorable, and compatibility between bending properties and abrasion resistance can be achieved at a higher level.

It is more preferable that the colored ink includes an acrylate compound (an acrylate oligomer) having a weight-average molecular weight of 1,500 to 10,000 as the polymerizable compound, at a content of 18% by mass to 28% by mass with respect to the total mass of the colored ink.

It is preferable that the polymerizable compound that can be included in the colored ink includes at least one kind of the acrylate compound, and a total mass of a monofunctional acrylate compound and a bifunctional acrylate compound is 50% by mass or higher with respect to the total mass of the polymerizable compound.

In a case where the total mass of the monofunctional acrylate compound and the bifunctional acrylate compound with respect to the total mass of the polymerizable compound is 50% by mass or higher, a mesh structure that the colored ink has after the curing does not become excessively dense, bending properties of the image is further improved, and adhesiveness is also improved.

[Colorless Ink Jetting Step]

The ink jet recording method includes the colorless ink jetting step of jetting the colorless ink including the polymerizable compound, the photopolymerization initiator, and the organic solvent from the ink jet head onto the colored ink after the heating.

By including the colorless ink jetting step, the colorless ink is jetted onto the colored ink that has been heated (that has been cured, in a case of undergoing the colored ink curing step), and the colorless ink is laminated on the colored ink.

The colorless ink is an ink which is colorless and includes a polymerizable compound, a photopolymerization initiator, and an organic solvent (that is, a colorless SUV ink).

A content of the organic solvent included in the colorless ink is preferably 50% by mass to 85% by mass, more preferably 60% by mass to 80% by mass, and even more preferably 70% by mass to 80% by mass, with respect to the total mass of the colorless ink.

In a case where the content of the organic solvent in the colorless ink is 50% by mass or higher, jettability is excellent. Meanwhile, in a case where the content is 85% by mass or lower, bleeding of the colored ink can be suppressed, in a case where the colorless ink is laminated on the colored ink.

It is preferable that the colorless ink further includes acrylic modified polyorganosiloxane having a weight-average molecular weight of 20,000 to 400,000.

The acrylic modified polyorganosiloxane can exhibit a function of a lubricant in the colorless ink and further improve abrasion resistance of the image. In a case where the weight-average molecular weight of the acrylic modified polyorganosiloxane is 20,000 or greater, the acrylic modified polyorganosiloxane is present in a dispersed state in the colorless ink after curing (that is, the acrylic modified polyorganosiloxane is present on a surface of the colorless ink after curing without being localized). Therefore, the effect of having excellent abrasion resistance persists for a long period of time. Meanwhile, in a case where the weight-average molecular weight of the acrylic modified polyorganosiloxane is 400,000 or smaller, jettability of the colorless ink is excellent.

The weight-average molecular weight can be measured by the method described above.

A content of the acrylic modified polyorganosiloxane in the colorless ink is preferably 0.1% by mass to 5% by mass, more preferably 0.3% by mass to 2% by mass, and even more preferably 0.5% by mass to 1% by mass, with respect to the total mass of the colorless ink.

In a case where the content of the acrylic modified polyorganosiloxane is 0.1% by mass or higher, abrasion resistance of the image is further improved. Meanwhile, in a case where the content is 5% by mass or lower, banding unevenness is effectively suppressed.

Banding unevenness refers to unevenness of banding generated in a case where an image is formed.

It is preferable that surface tension γ (C) of the colored ink and surface tension γ (T) of the colorless ink at a temperature of 25° C. satisfy a relationship of Expression (2). The unit of the surface tension is in mN/m.

$$\gamma(T) \leq \gamma(C) \qquad \text{Expression (2)}$$

In a case where the surface tension γ (T) of the colorless ink at a temperature of 25° C. is equal to or lower than the surface tension γ (C) of the colored ink (that is, the relationship of Expression (2) is satisfied), the colorless ink is easily soaked in and spreads on the colored ink in the colorless ink jetting step. That is, the colorless ink easily covers the colored ink. Therefore, the colorless ink is present on the surface of an image that is formed, and an image having more excellent abrasion resistance is obtained.

The surface tension can be measured by an automatic surface tensiometer CBVP-Z (Kyowa Interface Science Co., Ltd.) in an environment of a temperature of 25° C.

[Colorless Ink Heating Step]

The ink jet recording method includes the colorless ink heating step of heating the colorless ink jetted onto the colored ink that has been heated (that has been cured, in a case of undergoing the colored ink curing step) by maintaining the surface temperature of the recording medium at 40° C. or higher.

By including the colorless ink heating step in the ink jet recording method, at least a part of the organic solvent included in the colorless ink can be removed, and curing failure of the colorless ink in the colorless ink curing step which will be described below can be suppressed.

It is preferable that, in the colorless ink heating step, the organic solvent is removed such that the amount of the organic solvent included in the colorless ink reaches 10% by mass or lower with respect to the total mass of the colorless ink, it is more preferable that the organic solvent is removed such that the amount of the organic solvent reaches 3% by mass or lower with respect to the total mass of the colorless ink, and it is particularly preferable that the organic solvent is removed such that the amount of the organic solvent reaches 0% by mass (that is, all of the organic solvent is removed) with respect to the total mass of the colorless ink.

In the colorless ink heating step, it is preferable that the organic solvent included in the colorless ink is quickly removed, from the viewpoint of suppressing bleeding of the image that is formed. On the other hand, it is preferable that the organic solvent included in the colorless ink is relatively slowly removed, from the viewpoint of adhesiveness between the colored ink and the colorless ink.

Specifically, time that is taken from the landing of the colorless ink on the colored ink that has been heated (that has been cured, in a case of undergoing the colored ink curing step) to initiation of the heating is preferably 1 second or shorter and more preferably 0.5 seconds or shorter, and it is even more preferable that the heating is simultaneously performed with the landing.

In the colorless ink heating step, the heating is preferably performed for 1 second or longer by maintaining the surface temperature of the recording medium at 40° C. to 100° C., from the viewpoint of compatibility between suppression of bleeding of the image and adhesiveness between the colored ink and the colorless ink.

From the above viewpoints, the heating is more preferably performed for 1 second or longer by maintaining the surface temperature of the recording medium at 40° C. to 80° C., the heating is even more preferably performed for 5 seconds or longer by maintaining the surface temperature of the recording medium at 40° C. to 80° C., and the heating is particularly preferably performed for 8 seconds or longer by maintaining the surface temperature of the recording medium at 50° C. to 70° C.

The surface temperature can be measured by the method described above.

A boiling point of the organic solvent included in the colorless ink is preferably 75° C. to 300° C., more preferably 100° C. to 250° C., even more preferably 150° C. to 250° C., and particularly preferably 150° C. to 200° C.

In a case where the boiling point of the organic solvent included in the colorless ink is 75° C. or higher, adhesiveness between the colored ink and the colorless ink is further improved. Meanwhile, in a case where the boiling point is 300° C. or lower, bleeding of the colored ink is further suppressed.

The boiling point of the organic solvent can be measured by the method described above.

It is preferable that the boiling point Tbp (T) of the organic solvent included in the colorless ink and the boiling point Tbp (C) of the organic solvent included in the colored ink satisfy a relationship of Expression (1).

$$\mathrm{Tbp}(C) \leq \mathrm{Tbp}(T) \qquad \text{Expression (1)}$$

By setting the boiling point Tbp (T) of the organic solvent included in the colorless ink to be equal to or higher than the boiling point Tbp (C) of the organic solvent included in the colored ink (that is, the relationship of Expression (1) is satisfied), compatibility between adhesiveness between the colored ink and the colorless ink and suppression of bleeding of the colored ink can be achieved at a higher level.

The heating temperature and the heating time in the colorless ink heating step may be adjusted according to the boiling point of the organic solvent included in the colorless ink, the content of the organic solvent, and the transport speed of the recording medium.

[Colorless Ink Curing Step]

The ink jet recording method includes the colorless ink curing step of curing the colorless ink by irradiating the colorless ink after the heating with the active energy ray.

Through the colorless ink curing step, the polymerization reaction of the polymerizable compound proceeds, and the colorless ink is cured. As a result, bending properties of the image is maintained, and abrasion resistance and chemical resistance of the image are excellent as well.

It is preferable that the polymerizable compound included in the colorless ink is an oligomer having a weight-average molecular weight of 1,000 to 30,000.

By setting the weight-average molecular weight of the oligomer within the above range, viscosity of the colorless ink including the oligomer does not become excessively high, and jettability of the colorless ink is excellent.

Furthermore, by including the oligomer having a weight-average molecular weight within the above range in the colorless ink and curing the colorless ink, a weight-average molecular weight of a structural unit in the colorless ink after the curing is greater than that in a case where a monomer is cured. Therefore, the image has more excellent bending properties.

From the above viewpoints, the weight-average molecular weight of the oligomer is preferably 1,500 to 10,000 and more preferably 3,000 to 5,000.

It is preferable that the polymerizable compound included in the colorless ink is an acrylate compound, and it is more preferable that the acrylate compound is an oligomer. In a case where the polymerizable compound is the acrylate compound, an image having more excellent abrasion resistance can be obtained.

It is preferable that the polymerizable compound included in the colorless ink includes at least one kind of the acrylate compound, and a total mass of a monofunctional acrylate compound and a bifunctional acrylate compound is 30% by mass or higher with respect to the total mass of the polymerizable compound.

In a case where the total mass of the monofunctional acrylate compound and the bifunctional acrylate compound is 30% by mass or higher with respect to the total mass of the polymerizable compound, a mesh structure that the colorless ink has after the curing does not become excessively dense, bending properties of the image is further improved, and adhesiveness is also improved.

Hereinafter, a jetting method, a heating method, and a curing method of an ink in each step of the ink jet recording method of the present invention will be described in detail.

~Jetting Method~

As a jetting method of the inks in the colored ink jetting step and the colorless ink jetting step, an ink jet method is used.

The ink jet method is not particularly limited, and the ink jet method may be a known method, for example, any one of an electric charge control method in which an ink is jetted by using an electrostatic attraction force, a drop-on-demand method (a pressure pulse method) in which vibration pressure of a piezo element is used, an acoustic ink jet method in which an electrical signal is converted to an acoustic beam with which an ink is then irradiated, and the ink is jetted by using radiation pressure, and a thermal ink jet (BUBBLE JET (registered trademark)) method in which an ink is heated to form a bubble, and the pressure that is generated is used.

It is desirable that a size of a jetted liquid droplet is small, in order to form a high-quality image. A ratio of a surface area to a volume is greater in a small liquid droplet compared to that in a large liquid droplet size, and thus, evaporation of the organic solvent (that is, removal of the organic solvent) from the jetted ink becomes easy. Therefore, a small liquid droplet size brings about an advantage in the organic solvent removal rate.

The colored ink is preferably jetted at a liquid droplet size of smaller than 50 picoliters, is more preferably jetted at a liquid droplet size of smaller than 30 picoliters, and is even more preferably jetted at a liquid droplet size of smaller than 10 picoliters.

The colorless ink is preferably jetted at a liquid droplet size of smaller than 100 picoliters, is more preferably jetted at a liquid droplet size of smaller than 50 picoliters, and is even more preferably jetted at a liquid droplet size of smaller than 30 picoliters.

It is preferable that the liquid droplet size of the colorless ink is greater than the liquid droplet size of the colored ink. In a case where the liquid droplet size of the colorless ink is greater than the liquid droplet size of the colored ink, the colorless ink easily covers the colored ink. Therefore, the colorless ink is present on the surface of the image that is formed, and an image having excellent abrasion resistance and chemical resistance is obtained.

~Heating Method~

As a heating method of the inks in the colored ink heating step and the colorless ink heating step, a method can be suitably selected from methods capable of removing the organic solvents included in the colored ink and the colorless ink.

Examples of the heating method include a method using a heating plate (a resistance heater or an induction heater) disposed under the recording medium or a radiation heater (a heating bar, an infrared (IR) lamp, or solid IR) disposed on the recording medium.

Regarding the heating, the colored ink or the colorless ink may be heated using the heating plate, the radiation heater, or the like through the recording medium, the colored ink or the colorless ink may be heated from above the recording medium, and the colored ink or the colorless ink may be heated by combining these.

Each of preferable conditions such as the heating temperature and the heating time in the colored ink heating step and the colorless ink heating step is as described above.

~Curing Method~

As a curing method of the inks in the colored ink curing step and the colorless ink curing step, a method of curing the ink by irradiation with an active energy ray is used.

As the active energy ray, an α-ray, a γ-ray, an electron beam, an X-ray, an ultraviolet ray, visible light, infrared light, or the like can be used. In a case where a sensitizer is used, a peak wavelength of the active energy ray depends on absorption characteristics of the sensitizer, and for example, the peak wavelength is preferably 200 nm to 600 nm, more preferably 300 nm to 450 nm, and even more preferably 350 nm to 420 nm.

Illuminance on an exposure surface is preferably 100 $mJ/cm^2$ to 5,000 $mJ/cm^2$ and more preferably 300 $mJ/cm^2$ to 3,000 $mJ/cm^2$.

Examples of an active energy ray source include a mercury lamp, a gas or solid-state laser, and the like, and as a light source used for curing the ink, a mercury lamp and a metal halide lamp are widely known. However, removal of mercury is strongly desired from the viewpoint of current environmental protection, and substitution to a GaN-based semiconductor ultraviolet light emitting device is extremely useful industrially and environmentally. Furthermore, a light emitting diode (LED) and the laser diode (LD) are small-sized, have long service lives, are highly efficient, and are low in cost, and thus, the LED and the LD are expected as a light source for photocurable ink jet.

It is possible to use the LED and the LD as the active energy ray source. In particular, in a case where an ultraviolet source is required, an ultraviolet LED (UVLED) and an ultraviolet LD (UVLD) can be used. For example, NICHIA CORPORATION has launched a violet LED of which a main emission spectrum has a wavelength between 365 nm and 420 nm. In a case where a much shorter wavelength is needed, examples of the LED can include an LED that can emit an active energy ray having a center of a wavelength between 300 nm and 370 nm, disclosed in the specification of US6084250A. Other ultraviolet LEDs are also available, and irradiation with radiation of a different ultraviolet range is possible.

Irradiation time of the active energy ray is preferably 0.01 seconds to 120 seconds and more preferably 0.1 seconds to 90 seconds.

An irradiation condition and a basic irradiation method of the active energy ray are disclosed in JP1985-132767A (JP-S60-132767A).

Specifically, there are a shuttle system in which an active energy ray irradiation device is provided on a short serial head, and irradiation is performed while scanning the head in a width direction of the recording medium and a single pass system in which the active energy ray irradiation device is arranged to correspond to the entire area of one side of the recording medium.

The irradiation of the active energy ray is preferably performed for a certain period of time (preferably 0.01 seconds to 0.5 seconds, more preferably 0.01 seconds to 0.3 seconds, and even more preferably 0.01 seconds to 0.15 seconds) after the end of the ink heating step.

In addition, the curing of the ink may be completed by another light source that does not involve driving. In WO99/54415A, a method of using an optical fiber and a method of irradiating a recording portion with ultraviolet light by allowing a collimated light source to contact a mirror surface provided on a head unit side surface are disclosed as the irradiation method, and such curing methods can also be applied in the ink jet recording method of the present disclosure.

Hereinafter, the colored ink, the colorless ink, and the recording medium used in the ink jet recording method of the present disclosure will be described in detail.

[Colored Ink]

The colored ink includes the coloring agent and the organic solvent. A content of the coloring agent is preferably 0.1% by mass or higher with respect to the total mass of the colored ink.

The colored ink may further include a polymerizable compound and a photopolymerization initiator in addition to the coloring agent and the organic solvent.

In addition, the colored ink may include a component other than the components described above as necessary.

(Coloring Agent)

The colored ink includes at least one kind of the coloring agent. The coloring agent is not particularly limited, and the coloring agent may be a pigment or a dye.

The pigment is not particularly limited and can be suitably selected according to the purpose. The pigment can be dissolved or dispersed in a liquid medium of an ink.

The pigment may be any one of an organic pigment and an inorganic pigment, and the organic pigment and the inorganic pigment may be used in combination.

Examples of the organic pigment include a polycyclic pigment such as an azo lake, an azo pigment, a phthalocyanine pigment, a perylene pigment, a perinone pigment, an anthraquinone pigment, a quinacridone pigment, a dioxazine pigment, a diketopyrrolopyrrole pigment, a thioindigo pigment, an isoindolinone pigment, and a quinophthalone pigment, a dye lake such as a basic dye-type lake and an acidic dye-type lake, a nitro pigment, a nitroso pigment, aniline black, and a daylight fluorescent pigment.

Examples of the inorganic pigment include titanium oxide, iron oxide, calcium carbonate, barium sulfate, aluminum hydroxide, barium yellow, cadmium red, chrome yellow, and carbon black.

As the coloring agent, for example, the organic pigments or the inorganic pigments of the following numbers that are described in the color index can be used.

Examples of a blue pigment or a cyan pigment include Pigment Blue 1, 15, 15:1, 15:2, 15:3, 15:4, 15:6, 16, 17-1, 22, 27, 28, 29, 36, and 60;

examples of a green pigment include Pigment Green 7, 26, 36, and 50;

examples of a red pigment or a magenta pigment include Pigment Red 3, 5, 9, 19, 22, 31, 38, 42, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, and Pigment Orange 13, 16, 20, or 36;

examples of a yellow pigment include Pigment Yellow 1, 3, 12, 13, 14, 17, 34, 35, 37, 55, 74, 81, 83, 93, 94, 95, 97, 108, 109, 110, 120, 137, 138, 139, 153, 154, 155, 157, 166, 167, 168, 180, 185, and 193;

examples of a black pigment include Pigment Black 7, 28, and 26; and examples of a white pigment include Pigment White 6, 18, and 21.

In addition, a pigment that is not described in the color index can also be suitably used according to the purpose. For example, a pigment subjected to a surface treatment using a surfactant, a polymer dispersant, or the like, graft carbon, and the like can also be used.

Examples of the polymer dispersant include polyamidoamine and a salt thereof, polyvalent carboxylic acid and a salt thereof, high molecular weight unsaturated acid ester, modified polyurethane, and polyether ester.

A commercially available product of the polymer dispersant may be used, and examples of the commercially available product include a polymer dispersant such as Disper-BYK-101, DisperBYK-102, DisperBYK-103, DisperBYK-106, DisperBYK-111, DisperBYK-161, DisperBYK-162, DisperBYK-163, DisperBYK-164, DisperBYK-166, DisperBYK-167, DisperBYK-168, DisperBYK-170, DisperBYK-171, DisperBYK-174, and DisperBYK-182 (all manufactured by BYK-Chemie GmbH), EFKA 4010, EFKA 4046, EFKA 4080, EFKA 5010, EFKA 5207, EFKA 5244, EFKA 6745, EFKA 6750, EFKA 7414, EFKA 745, EFKA 7462, EFKA 7500, EFKA 7570, EFKA 7575, and EFKA 7580 (all manufactured by EFKA Additives B.V), and DISPERSE AID 6, DISPERSE AID 8, DISPERSE AID 15, and DISPERSE AID 9100 (manufactured by SAN NOPCO LIMITED); various Solsperse dispersing agents (manufactured by AVECIA) such as Solsperse 3000, 5000, 9000, 12000, 13240, 13940, 17000, 22000, 24000, 26000, 28000, 32000, 36000, 39000, 41000, and 71000; ADEKA PLURONIC L31, F38, L42, L44, L61, L64, F68, L72, P95, F77, P84, F87, P94, L101, P103, F108, L121, and P-123 (manufactured by ADEKA CORPORATION), IONET (registered trademark) S-20 (manufactured by Sanyo Chemical Industries, Ltd.), and "DISPARLON KS-860, 873SN, 874 (a polymer dispersant), #2150 (aliphatic polyvalent carboxylic acid), and #7004(a polyether ester type)" manufactured by Kusumoto Chemicals, Ltd.

A content ratio between the polymer dispersant and the pigment (polymer dispersant:pigment) in the pigment subjected to the surface treatment using the polymer dispersant is preferably 1:1 to 1:10, more preferably 1:1 to 1:5, and even more preferably 1:2 to 1:3.

As the coloring agent, a commercially available product can be used. Examples of the commercially available product include Paliotol (BASF SE), Cinquasia and Irgalite (all Ciba Specialty Chemicals plc.), and Hostaperm (Clariant UK Ltd).

Among these coloring agents, a phthalocyanine pigment such as phthalocyanine blue 15:4 is preferable as the cyan pigment, an azo pigment such as pigment yellow 120, pigment yellow 151, and pigment yellow 155 is preferable as the yellow pigment, a quinacridone pigment such as pigment violet 19 and mixed crystal quinacridone such as Cinquasia MAGENTA L4540 is preferable as the magenta pigment, and a carbon black pigment such as pigment black 7 is preferable as the black pigment.

A volume average particle diameter of the coloring agent is not particularly limited, and from the viewpoint of jettability of the ink, the volume average particle diameter is preferably smaller than 8 µm, more preferably smaller than 5 µm, even more preferably smaller than 1 µm, and particularly preferably smaller than 0.5 µm. A lower limit of the volume average particle diameter of the coloring agent is not particularly limited, and from the viewpoint of colorability and light fastness, the lower limit of the volume average particle diameter is preferably 0.001 µm or larger and more preferably 0.01 µm or larger.

The volume average particle diameter can be measured by a laser diffraction particle size distribution analyzer (for example, Mastersizer 2000 manufactured by Malvern Instruments Ltd, a laser diffraction/scattering particle size distribution analyzer LA-920 manufactured by HORIBA, Ltd., or the like).

The content of the coloring agent is preferably 20% by mass or lower, more preferably 10% by mass or lower, even more preferably 8% by mass or lower, and particularly preferably 1% by mass to 5% by mass, with respect to the total mass of the colored ink.

(Organic Solvent)

The colored ink includes at least one kind of the organic solvent.

The organic solvent is a liquid at an ambient temperature and functions as a dispersion medium or a solvent for the component included in the colored ink, such as the coloring agent.

The organic solvent is not particularly limited and can be selected from any organic solvents that are generally used in the printing industry.

Examples of the organic solvent include glycol ether, glycol ether ester, alcohol, ketone, ester, and pyrrolidone.

Examples of the glycol ether include ethylene glycol monomethyl ether, diethylene glycol diethyl ether, and triethylene glycol monobutyl ether.

Examples of the ketone include methyl ethyl ketone.

Examples of the ester include 3-methoxybutyl acetate and γ-butyrolactone.

Among these, diethylene glycol diethyl ether, ethylene glycol monomethyl ether, 3-methoxybutyl acetate, and γ-butyrolactone are preferable.

A preferable aspect of the boiling point and the content of the organic solvent included in the colored ink is as described above.

(Polymer)

The colored ink may further include a polymer having a molecular weight of 10,000 to 150,000 (preferably 20,000 to 100,000) at an amount of 2% by mass or higher with respect to the total mass of the colored ink.

The polymer is distinguished from the polymerizable compound which will be described below, in that the polymer does not have a group that can be polymerized in a case of irradiation with an active energy ray.

Examples of the polymer include an epoxy resin, polyester, and a vinyl or (meth)acrylic resin.

The (meth)acrylic resin is a concept including a methacrylic resin and an acrylic resin.

Examples of the vinyl resin include vinyl chloride, vinyl acetate, and a copolymer of vinyl chloride and vinyl acetate.

Examples of the (meth)acrylic resin include a copolymer of methyl methacrylate and n-butyl methacrylate.

Among these, the vinyl resin and the (meth)acrylic resin are preferable.

A commercially available product of the polymer may be used, and examples of the commercially available product include VINNOL (registered trademark) E15/45 (a copolymer of vinyl chloride and vinyl acetate, weight-average molecular weight (Mw)=50,000) of Wacker Chemie AG, and Elvacite 2013 (a copolymer of methyl methacrylate and n-butyl methacrylate, Mw=34,000), Elvacite 2014 (a copolymer of methyl methacrylate and n-butyl methacrylate, Mw=119,000), and Elvacite 4099 (a copolymer of methyl methacrylate and n-butyl methacrylate, Mw=15,000) of Lucite International.

A preferable aspect of the weight-average molecular weight and the content of the polymer is as described above.

(Polymerizable Compound and Photopolymerization Initiator)

The colored ink may further include a polymerizable compound and a photopolymerization initiator.

As the polymerizable compound and the photopolymerization initiator that can be included in the colored ink, the compounds that are the same as the polymerizable compound and the photopolymerization initiator included in the colorless ink which will be described below can be used, and preferable aspect thereof is also the same as that of the polymerizable compound and the photopolymerization initiator included in the colorless ink. Details will be described below.

A preferable aspect of a content of the polymerizable compound that can be included in the colored ink is as described above.

(Other Components)

Components other than the components described above may be added to the colored ink as necessary.

Examples of other components include a surfactant, a polymerization inhibitor, a sensitizer, an ultraviolet absorber, an antioxidant, an antifading agent, conductive salts, and a basic compound.

The surfactant may be added to the colored ink in order to impart stable jettability for a long period of time.

Examples of the surfactant include the surfactants described in JP-1987-173463A (JP-S62-173463A) and JP1987-183457A (JP-S62-183457A), and the like. For example, an anionic surfactant such as dialkyl sulfosuccinates, alkyl naphthalene sulfonates, and fatty acid salts, a nonionic surfactant such as polyoxyethylene alkyl ethers, polyoxyethylene alkyl allyl ethers, acetylene glycols, and block copolymers of polyoxyethylene and polyoxypropylene, and a cationic surfactant such as alkylamine salts and quaternary ammonium salts can be used.

A content of the surfactant in the colored ink is suitably selected according to the purpose of use, and content of the surfactant is preferably 0.0001% by mass to 1% by mass with respect to the total mass of the colored ink.

~Physical Properties of Colored Ink~

The surface tension of the colored ink is preferably 20 mN/m to 40 mN/m, more preferably 22 mN/m to 30 mN/m, and even more preferably 25 mN/m to 30 mN/m, at 25° C.

The surface tension can be measured by the method described above.

Viscosity of the colored ink is preferably 200 mPa·s or lower, more preferably 100 mPa·s or lower, even more preferably 25 mPa·s or lower, particularly preferably 10 mPa·s or lower, and most preferably 7 mPa·s or lower, at 25° C.

One suitable aspect of the viscosity of the colored ink is 10 mPa·s or lower, preferably 2 mPa·s to 10 mPa·s, more preferably 4 mPa·s to 8 mPa·s, and even more preferably 5 mPa·s to 7 mPa·s, at 25° C. Examples of a method for adjusting the viscosity of the colored ink to 10 mPa·s or lower include a method of adding the organic solvent to the colored ink in an amount of 50% by mass or higher to overcome relatively high viscosity of an acrylate monomer and oligomer that can be used in the colored ink.

The viscosity of the colored ink is a value measured under the condition of 25° C. (±1° C.) using VISCOMETER TV-22 (manufactured by TOKI SANGYO CO., LTD).

[Colorless Ink]

"Colorless" in the present specification refers to being substantially colorless. The colorless ink is an ink which substantially does not include a coloring agent and is an ink in which a content of the coloring agent is lower than 0.1% by mass with respect to the total amount of an ink composition.

The colorless ink includes a polymerizable compound, a photopolymerization initiator, and an organic solvent.

The colorless ink may include a component other than the components described above as necessary.

(Polymerizable Compound)

The colorless ink includes at least one kind of the polymerizable compound. The polymerizable compound refers to a compound that proceeds a polymerization reaction by being irradiated with an active energy ray under the presence of a photopolymerization initiator.

The polymerizable compound can include a monomer, an oligomer, or a mixture thereof.

The monomer and/or oligomer can have different functionalities, and a mixture including a combination of a monofunctional, bifunctional, trifunctional or higher functional monomer and/or oligomer can be used.

It is preferable that the polymerizable compound includes the oligomer.

It is preferable that the oligomer includes a main chain, for example, a polyester main chain, a urethane main chain, an epoxy main chain, or a polyether main chain, and one or a plurality of groups that can be polymerized by an active energy ray. The group that can be polymerized may be any group that can be polymerized in a case of being exposed to an active energy ray.

It is preferable that the oligomer is polymerized by free radical polymerization. That is, an oligomer having a group that can be subjected to the free radical polymerization is preferable.

Examples of the group that can be subjected to the free radical polymerization include a (meth)acryloyl group.

The (meth)acryloyl group is a concept including a methacryloyl group and an acryloyl group.

It is preferable that the oligomer has one, two, three, four, five, or six groups that can be subjected to the free radical polymerization. That is, a monofunctional to hexafunctional oligomer is preferable.

From the viewpoint of bending properties of the ink after the curing, a total mass of the monofunctional oligomer and the bifunctional oligomer is preferably 30% by mass or higher, more preferably 40% by mass or higher, and even more preferably 50% by mass or higher, with respect to the total mass of the oligomer.

The oligomer preferably has a urethane main chain and more preferably has a urethane acrylate oligomer, from the viewpoint of having excellent adhesiveness and bending properties.

In addition, the oligomer preferably has a trifunctional, tetrafunctional, pentafunctional, hexafunctional, or higher functional urethane acrylate oligomer and particularly preferably a hexafunctional urethane acrylate oligomer, from the viewpoint of having favorable chemical resistance.

As another example of the oligomer, an epoxy-based oligomer such as bisphenol A epoxy acrylate and epoxy novolac acrylate may be used, from the viewpoint of having a rapid curing rate and having favorable chemical resistance.

The oligomer is preferably an oligomer having a weight-average molecular weight of 1,000 to 30,000 and more preferably an oligomer having a weight-average molecular weight of 1,500 to 10,000. The weight-average molecular weight can be measured by the method described above.

The oligomer has viscosity of preferably 0.5 Pa·s to 20 Pa·s at 60° C., more preferably 5 Pa·s to 15 Pa·s at 60° C., and most preferably 5 Pa·s to 10 Pa·s at 60° C. The viscosity of the oligomer can be measured using an ARG2 rheometer manufactured by TA Instruments that uses a steel cone with an inclination of 40 mm/2° at a shear rate of 25 seconds$^{-1}$ at 60° C.

A monomer that can be subjected to free radical polymerization is known in the technical field, and (meth)acrylate, $\alpha,\beta$-unsaturated ether, vinylamide, and a mixture thereof are included in the monomer that can be subjected to free radical polymerization.

A monofunctional (meth)acrylate monomer is known in the technical field, and the monofunctional (meth)acrylate monomer is preferably an ester of acrylic acid. Preferable examples of the ester of acrylic acid include phenoxyethyl acrylate (PEA), cyclic TMP formal acrylate (CTFA), isobornyl acrylate (IBOA), tetrahydrofurfuryl acrylate (THFA), 2-(2-ethoxyethoxy)ethyl acrylate, octadecyl acrylate (ODA), tridecyl acrylate (TDA), isodecyl acrylate (IDA), and lauryl acrylate. Among these, PEA is particularly preferable.

In a polyfunctional (meth)acrylate monomer, a bifunctional monomer, a trifunctional monomer, and a tetrafunctional monomer are included. Examples of a polyfunctional acrylate monomer that can be included in the ink include hexanediol diacrylate, trimethylolpropane triacrylate, pentaerythritol triacrylate, polyethylene glycol diacrylate (for example, tetraethylene glycol diacrylate), dipropylene glycol diacrylate, tri(propylene glycol) triacrylate, neopentyl glycol diacrylate, bis(pentaerythritol) hexaacrylate, and an acrylate ester of an ethoxylated or propoxylated glycol and polyol, for example, propoxylated neopentyl glycol diacrylate, ethoxylated trimethylolpropane triacrylate, and a mixture thereof.

Furthermore, in the polyfunctional (meth)acrylate monomer, an ester of methacrylic acid (that is, methacrylate) such as hexanediol dimethacrylate, trimethylolpropane trimethacrylate, triethylene glycol dimethacrylate, diethylene glycol dimethacrylate, ethylene glycol dimethacrylate, and 1,4-butanediol dimethacrylate are included. In addition, a mixture of (meth)acrylates can also be used.

The (meth)acrylate is a concept including acrylate and methacrylate. The monofunctional monomer and the polyfunctional monomer also have their standard meaning, that is, the monofunctional monomer and the polyfunctional monomer refer to one group and two or more groups, respectively, that are used in the polymerization reaction in the case of the curing.

An $\alpha,\beta$-unsaturated ether monomer can be polymerized by free radical polymerization, and in a case where the $\alpha,\beta$-unsaturated ether monomer is used in combination with one or a plurality of (meth)acrylate monomers, the monomers can become useful in decreasing the viscosity of the ink. Examples of the $\alpha,\beta$-unsaturated ether monomer are known in the technical field, and the examples include a vinyl ether such as triethylene glycol divinyl ether, diethylene glycol divinyl ether, 1,4-cyclohexanedimethanol divinyl ether, and ethylene glycol monovinyl ether. In addition, a mixture of the $\alpha,\beta$-unsaturated ether monomers can also be used.

It is also possible to use N-vinylamide and N-(meth)acryloylamine. The N-vinylamide has a vinyl group that is bonded to a nitrogen atom of amide and may be further substituted in the same manner as in the case of the (meth)acrylate monomer. Preferable examples of the N-vinylamide include N-vinyl caprolactam (NVC) and N-vinyl pyrrolidone (NVP). The N-acryloylamine also has a vinyl group bonded to amide, however, the vinyl group is bonded to the amide through a carbonyl carbon atom, and the N-acryloylamine may be further substituted in the same manner as in the case of the (meth)acrylate monomer. Preferable examples of the N-acryloylamine include N-acryloyl morpholine (ACMO).

Examples of the polymerizable compound include a compound that can be polymerized by cationic polymerization. Examples of such a compound include oxetane, alicyclic epoxide, bisphenol A epoxide, epoxy novolac, and the like.

As the polymerizable compound, a mixture of a cationic curable monomer and oligomer may be used. For example, the polymerizable compound may include a mixture of an epoxide oligomer and an oxetane monomer.

A compound that can be subjected to the free radical polymerization and a compound that can be subjected to the cationic polymerization may be combined and used as the polymerizable compound.

As the polymerizable compound, a commercially available product may be used, and examples of the commercially available product include an oligomer such as CN996 (a bifunctional oligomer, urethane acrylate, weight-average molecular weight (Mw)=2,850) of Sartomer, UA-122P (a bifunctional oligomer, urethane acrylate, Mw=1,100) of Shin Nakamura Chemical Co., Ltd., and SHIKOH (registered trademark) UV-6630B (a bifunctional oligomer, urethane acrylate, Mw=3,000), SHIKOH (registered trademark) UV-3310B (a bifunctional oligomer, urethane acrylate, Mw=5,000), and SHIKOH (registered trademark) UV-7630B (a hexafunctional oligomer, urethane acrylate, Mw=2,200) of The Nippon Synthetic Chemical Industry Co., Ltd. and a monomer such as N-vinyl caprolactam (a monofunctional monomer) of BASF SE, SR339C (phenoxyethyl acrylate, a monofunctional monomer) and SR506D (isobornyl acrylate, a monofunctional monomer) of Sartomer, and dipropylene glycol diacrylate (a polyfunctional monomer) of Sartomer.

A preferable aspect of a content of the polymerizable compound is as described above.

(Photopolymerization Initiator)

The colorless ink includes at least one kind of the photopolymerization initiator.

In a case where the colorless ink includes the polymerizable compound that can be subjected to the free radical polymerization, it is preferable that the photopolymerization initiator includes a free radical photopolymerization initiator, and in a case where the colorless ink includes the polymerizable compound that can be subjected to the cationic polymerization, it is preferable that the photopolymerization initiator includes a cationic photopolymerization initiator.

In a case where the colorless ink includes a combination of the polymerizable compound that can be subjected to the free radical polymerization and the polymerizable compound that can be subjected to the cationic polymerization, it is preferable that the colorless ink includes both of the free radical photopolymerization initiator and the cationic photopolymerization initiator.

The free radical photopolymerization initiator can be selected from any one of free radical photopolymerization initiators known in the technical field. Examples of the free radical photopolymerization initiators include benzophenone, 1-hydroxycyclohexylphenyl ketone, 1-[4-(2-hydroxyethoxy)-phenyl]-2-hydroxy-2-methyl-1-propan-1-one, 2-benzyl-2-dimethylamino-(4-morpholinophenyl)butan-1-one, isopropyl thioxanthone, benzyl dimethyl ketal, bis(2,6-dimethylbenzoyl)-2,4,4-trimethylpentyl phosphine oxide, and a mixture thereof. These photopolymerization initiators are well known, and for example, IRGACURE (registered trademark), Darocur (registered trademark) (from Ciba), and Lucirin of BASF SE are commercially available.

As the cationic photopolymerization initiator, for example, a sulfonium-based photopolymerization initiator or an iodonium-based photopolymerization initiator can be used. For example, Rhodorsil PI 2074 of Rhodia; MC AA, MC BB, MC CC, MC CC PF, and MC SD of Siber Hegner; UV9380c of Alfa Chemicals Ltd; Uvacure 1590 of UCB Chemicals; and Esacure 1064 of Lamberti S.p.A. are commercially available.

A content of the photopolymerization initiator in the colorless ink is preferably 1% by mass to 20% by mass and more preferably 4% by mass to 10% by mass, with respect to the total mass of the colorless ink.

(Organic Solvent)

The colorless ink includes at least one kind of the organic solvent.

The organic solvent is a liquid at an ambient temperature and functions as a dispersion medium or a solvent for the component included in the colorless ink.

The organic solvent is not particularly limited and can be selected from any organic solvents that are generally used in the printing industry.

As the organic solvent that is included in the colorless ink, the organic solvent that is the same as the organic solvent included in the colored ink can be used, and preferable aspect thereof is also the same as that of the organic solvent included in the colored ink.

A preferable aspect of the boiling point and the content of the organic solvent included in the colorless ink is as described above.

(Acrylic Modified Polyorganosiloxane)

The colorless ink may further include the acrylic modified polyorganosiloxane having a molecular weight of 20,000 to 400,000 in an amount of 0.1% by mass to 5% by mass with respect to the total mass of the colorless ink.

It is preferable that the acrylic modified polyorganosiloxane is a copolymer of radically polymerizable polysiloxane having a radically polymerizable functional group and (meth)acrylic acid ester.

As the acrylic modified polyorganosiloxane, a commercially available product may be used, and examples of the commercially available product include CHALINE R175S or R170 of Nissin Chemical Co., Ltd.

~Physical Properties of Colorless Ink~

The surface tension of the colorless ink is preferably 18 mN/m to 36 mN/m, more preferably 20 mN/m to 30 mN/m, and even more preferably 22 mN/m to 26 mN/m, at a temperature of 25° C.

It is preferable that the surface tension γ (T) of the colorless ink is lower than or equal to the surface tension γ (C) of the colored ink at the temperature of 25° C. A difference between the surface tension γ (T) of the colorless ink and the surface tension γ (C) of the colored ink is preferably 1 mN/m or higher and more preferably 5 mN/m or higher at the temperature of 25° C.

The surface tension can be measured by the method described above.

The viscosity of the colorless ink is preferably 200 mPa·s or lower, more preferably 100 mPa·s or lower, even more preferably 25 mPa·s or lower, particularly preferably 10 mPa·s or lower, and most preferably 7 mPa·s or lower, at 25° C.

The viscosity of the colorless ink can be measured by the method that is the same as the method for measuring the viscosity of the colored ink described above.

One suitable aspect of the viscosity of the colorless ink is 10 mPa·s or lower, preferably 2 mPa·s to 10 mPa·s, more preferably 4 mPa·s to 8 mPa·s, and even more preferably 5 mPa·s to 7 mPa·s, at 25° C. Such viscosity can be achieved by including the organic solvent in the colorless ink in an amount of 50% by mass or higher to overcome relatively high viscosity of the acrylate monomer and oligomer that can be used in the colorless ink.

[Recording Medium]

The recording medium can be suitably selected from materials that are used for uses that require bending properties and abrasion resistance (for example, a seat sheet for a car, a bag, and the like).

Examples of the recording medium include leather, fabric, a polymer film, and the like.

Examples of the material that constitutes the recording medium include a natural fiber such as a collagen fiber, polyvinyl chloride (PVC), polyurethane (PU), polyamide (PA), and the like.

As the recording medium, leather is preferable. Examples of the leather include natural leather, imitation leather, synthetic leather, artificial leather, and the like.

The natural leather is composed of a collagen fiber which is a main component in a fibrous protein called collagen. Several hundreds of fine fibers (fibrils) cluster and form a fiber, and several to several tens of the fibers cluster and form a fiber bundle. A structure of the natural leather is a structure formed by three-dimensional intertwining of the fiber bundles.

In the natural leather, a grain side layer on the surface thereof and a reticular layer on the inside from an interlayer which is continuous from the grain side layer are distinguished from each other, and the natural leather forms a continuous structure. Since the fiber bundles of collagen are dense in the grain side layer, the grain side layer is lustrous and soft, and has excellent texture. Fibers in the reticular layer are slightly thick and are intricately intertwined, and thus strength of the natural leather is maintained.

The imitation leather/PVC leather is obtained by using a woven fabric or a knitted material in the portion that corresponds to the reticular layer of the natural leather and that maintains strength and coating a surface of a fabric with a polyvinyl chloride resin, so as to impart a leather-like appearance that corresponds to the grain side layer. The imitation leather is represented by PVC leather.

The synthetic leather is obtained by coating a surface of a woven fabric, a knitted material, or a non-woven fabric with foam of polyurethane or the like and applying a nylon resin or a polyurethane resin thereon to finish off.

As the artificial leather, a non-woven fabric which has a fiber layer having a three-dimensional structure that resembles the collagen fiber structure of the natural leather is used. In addition, a texture of leather tone is obtained by using an ultrafine fiber of 0.1 denier or less in a surface portion.

The artificial leather is formed of a non-woven fabric of a fiber layer which is a random three-dimensional structure obtained by crossing ultrafine fibers of nylon or polyester to form a bundle shape and an elastic polyurethane resin.

<Ink Jet Recording Device>

An ink jet recording device of the present disclosure is an ink jet recording device which performs the ink jet recording method of the present disclosure, the device including a colored ink jetting portion which jets the colored ink onto the recording medium, a colored ink heating portion which heats the colored ink jetted onto the recording medium by maintaining the surface temperature of the recording medium at 40° C. or higher, a colorless ink jetting portion which jets the colorless ink onto the colored ink after the heating, a colorless ink heating portion which heats the colorless ink jetted onto the colored ink after the heating by maintaining the surface temperature of the recording medium at 40° C. or higher, and an irradiation portion for curing a colorless ink which performs irradiation with an active energy ray for curing the colorless ink after the heating.

The ink jet recording device may further include an irradiation portion for curing a colored ink which performs irradiation with an active energy ray for curing the colored ink after the heating.

A recording system of the ink jet recording device is not particularly limited, as long as the device includes the above constitutions. As the recording system, there are a shuttle system in which a short serial head is used and recording is performed while scanning the head in a width direction of a support and a line system (that is, a single pass system) using a line head in which a recording element is arranged to correspond to the entire area of one side of the support.

As a first embodiment of the ink jet recording device, a shuttle system ink jet recording device will be described using FIG. 1 and FIG. 2.

Figure 2:
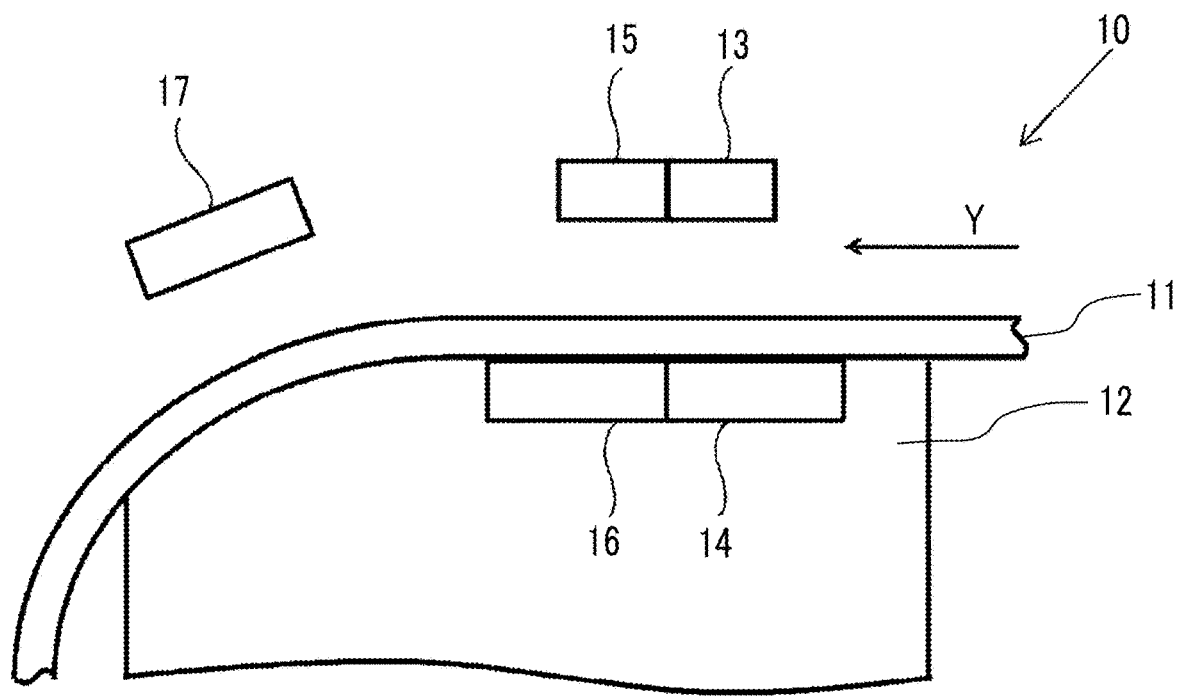
FIG. 2 is a schematic side view of the main portions of the shuttle system ink jet recording device.

FIG. 1 is a schematic top view of main portions of the shuttle system ink jet recording device, and FIG. 2 is a side view thereof.

An ink jet recording device 10 according to the first embodiment is a device including a support (a platen) 12 which supports a recording medium 11, a colored ink jetting portion 13 which jets a colored ink from a plurality of jetting ports (nozzles) onto a surface of the recording medium 11 while moving in an X direction (a horizontal direction of the recording medium) and causes the colored ink to land on the recording medium, a colored ink heating portion 14 which is positioned on the rear surface side of the recording medium 11 and heats the colored ink landed on the surface of the recording medium 11 by maintaining a surface temperature of the recording medium at 40° C. or higher, a colorless ink jetting portion 15 which is placed frontward in a moving direction (a Y direction) of the recording medium 11, jets a colorless ink from a plurality of the jetting ports (nozzles) onto a surface of the colored ink that has been heated while moving in the X direction (the horizontal direction of the recording medium), and causes the colorless ink to land on the colored ink that has been heated, a colorless ink heating portion 16 which is positioned on the rear surface side of the recording medium 11 and heats the colorless ink landed on the surface of the colored ink that has been heated by maintaining the surface temperature of the recording medium at 40° C. or higher, and an irradiation portion 17 for curing a colorless ink which is placed frontward in the moving direction (the Y direction) of the recording medium 11 and cures the colorless ink by irradiating the colorless ink that has been heated with an active energy ray.

The colored ink jetting portion 13 and the colorless ink jetting portion 15 have a structure which jets the colored ink from the nozzle (not shown in the drawing) by a piezo system or the like and can travel by being fixed on a unit frame in the X direction on a guide rail by travelling means (not shown in the drawing). The travelling means is configured of an electric motor, an electronic circuit for controlling the motor, and the like.

As the colored ink and the colorless ink, the colored ink and the colorless ink used in the ink jet recording method of the present disclosure are used.

The recording medium 11 is pinched by a pinch roller (not shown in the drawing) and a feed roller (not shown in the drawing), while being supported by the platen 12. The recording medium 11 is transported in the Y direction by the rotation of the rollers upon finishing of the travelling of the colored ink jetting portion 13 and the colorless ink jetting portion 15 from one end to the other end of the recording medium 11 in the X direction while the colored ink jetting portion 13 jets the colored ink, and the colorless ink jetting portion 15 jets the colorless ink. Furthermore, as the recording medium 11, the recording medium used in the ink jet recording method of the present disclosure can be used.

The colored ink heating portion 14 and the colorless ink heating portion 16 are in the inside of the platen 12 and disposed on the rear surface side of the recording medium 11. The colored ink heating portion 14 and the colorless ink heating portion 16 heat the colored ink landed on the surface of the recording medium 11 or the colorless ink landed on the colored ink that has been heated and remove at least parts of organic solvents included in the colored ink and the colorless ink. As the colored ink heating portion 14 and the colorless ink heating portion 16, an electric heating heater, an infrared heater, and an induction (IH) heater can be used, and the colored ink heating portion 14 and the colorless ink heating portion 16 perform heating such that at least a part of the organic solvent included in the colored ink or the colorless ink is removed after the colored ink is jetted and lands on the surface of the recording medium or after the colorless ink is jetted and lands on the colored ink that has been heated.

A heating temperature of the colored ink heating portion 14 is maintained such that the surface temperature of the recording medium 11 is 40° C. or higher, and it is preferable that the surface temperature of the recording medium 11 is 40° C. to 100° C. Heating time is preferably 1 second or longer.

A heating temperature of the colorless ink heating portion 16 is maintained such that the surface temperature of the recording medium 11 is 40° C. or higher, and it is preferable that the surface temperature of the recording medium 11 is 40° C. to 90° C. Heating time is preferably 1 second or longer.

The positions of the colored ink heating portion 14 and the colorless ink heating portion 16 are not limited to the rear surface side of the recording medium 11 and may be the front surface side or both sides of the recording medium 11. In a case where the colored ink heating portion 14 and the colorless ink heating portion 16 are disposed on the front surface side of the recording medium 11, the colored ink heating portion 14 and the colorless ink heating portion 16 can be positioned on the same guide rail as that for the colored ink jetting portion 13 and the colorless ink jetting portion 15 or can be positioned by being fixed frontward in the Y direction (a platen transport direction) in a state of being independently separated from the guide rail. In a case where the colored ink heating portion 14 and the colorless ink heating portion 16 are provided on the same guide rail as that for the colored ink jetting portion 13 and the colorless ink jetting portion 15, each ink heating portion is installed rearward in a travelling direction of each ink jetting portion.

The irradiation portion 17 for curing a colorless ink is equipped with a UVLED (abbreviation of Ultra Violet Light Emitting Diode), is disposed on the frontward side in the moving direction (the Y direction) of the recording medium 11, and can travel in the X direction by moving means (not shown in the drawing). The irradiation portion 17 for curing a colorless ink cures the colorless ink by irradiating the colorless ink that has been heated with an active energy ray (for example, an ultraviolet ray).

Active energy ray irradiation means in the irradiation portion 17 for curing a colorless ink is not particularly limited, and it is preferable to use a UVLED lamp of which an irradiation light amount can be freely adjusted and ON/OFF can be freely controlled by changing electrical current and light emission pulse width, thus decreasing power consumption. In addition, other lamps such as a metal halide lamp, a xenon lamp, and a high-pressure mercury lamp may be used by providing a shutter in the irradiation portion 17 for curing a colorless ink such that an irradiation amount of the active energy ray can be adjusted.

As described above, the ink jet recording device 10 jets the colored ink from the colored ink jetting portion 13 onto the surfaces of the recording medium 11 supported on the platen (support) 12, removes the organic solvent included in the colored ink landed on the surface of the recording medium 11 by the colored ink heating portion 14 positioned on the rear surface side of the recording medium, jets the colorless ink from the colorless ink jetting portion 15, removes the organic solvent included in the colorless ink landed on the colored ink that has been heated by the colorless ink heating portion 16 positioned on the rear surface side of the recording medium, and cures the colorless ink by irradiation with an active energy ray by the irradiation portion 17 for curing a colorless ink, thus forming an image in which the colored ink and the colorless ink are laminated on the recording medium 11.

According to the ink jet recording device according to the first embodiment, an image having excellent abrasion resistance and bending properties can be formed.

It is preferable that a nozzle diameter Dc in the colored ink jetting portion and a nozzle diameter Dt in the colorless ink jetting portionk satisfy a relationship of Expression (3).

$$Dc \leq Dt \qquad \text{Expression (3)}$$

In a case where the nozzle diameter Dc in the colored ink jetting portion and the nozzle diameter Dt in the colorless ink jetting portion k satisfy the relationship of Expression (3), the colorless ink easily covers the colored ink. Therefore, the colorless ink is present on the surface of an image that is formed, and an image having excellent abrasion resistance is obtained.

In the ink jet recording device of the first embodiment, a case where the colored ink jetting portion and the colorless ink jetting portion are separated from or independent of the irradiation portion for curing a colorless ink has been described as an example, however, the ink jet recording device is not limited thereto, and the colored ink jetting portion and the colorless ink jetting portion and the irradiation portion for curing a colorless ink may be fixed together on a unit frame.

Furthermore, in the ink jet recording device of the first embodiment, a case where the colorless ink jetting portion is disposed frontward with respect to the colored ink jetting portion in the Y direction is described as an example, however, the ink jet recording device is not limited thereto, and the colored ink jetting portion and the colorless ink jetting portion may be disposed at the same position (juxtaposed in the X direction) in the Y direction.

In this case, an image may be formed on the recording medium in the following manner. After jetting the colored ink from the colored ink jetting portion and removing the organic solvent included in the colored ink landed on the recording medium by the colored ink heating portion positioned on the rear surface side of the recording medium, the feed roller is reversely rotated so as to rewind the recording medium. The colorless ink is jetted from the colorless ink jetting portion, the organic solvent included in the colorless ink landed on the colored ink that has been heated is removed by the colorless ink heating portion positioned on the rear surface side of the recording medium, and the colorless ink is cured by the irradiation with an active energy ray by the irradiation portion for curing a colorless ink, thus forming an image on the recording medium.

As a second embodiment of the ink jet recording device, a single pass system ink jet recording device will be described using FIG. 3.

Figure 3:
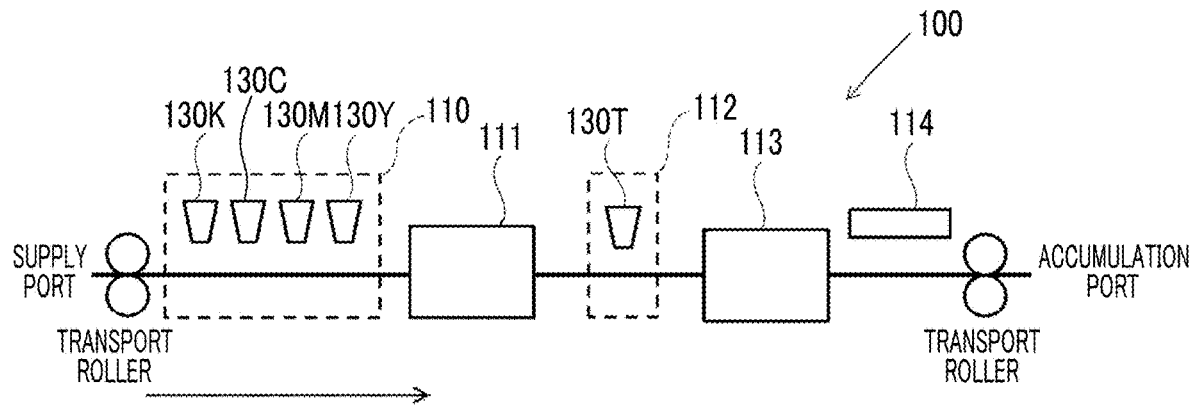
FIG. 3 is a schematic view showing a configuration example of an entire single pass system ink jet recording device.

FIG. 3 is a schematic view showing a configuration example of the entire single pass system ink jet recording device.

As shown in FIG. 3, an ink jet recording device 100 according to the second embodiment includes a colored ink jetting portion 110 which jets a colored ink onto a recording medium sequentially in a transport direction (a direction of the arrow in the figure) of the recording medium, a colored ink heating portion 111 which heats the colored ink jetted onto the recording medium by maintaining the temperature of the colored ink at 40° C. or higher, a colorless ink jetting portion 112 which jets a colorless ink onto the colored ink that has been heated, a colorless ink heating portion 113 which heats the colorless ink jetted onto the colored ink that has been heated by maintaining the temperature of the colorless ink at 40° C. or higher, and an irradiation portion 114 for curing a colorless ink which performs irradiation with an active energy ray for curing the colorless ink that has been dried heated.

The recording medium supplied to the ink jet recording device is delivered from a supply port which supplies the recording medium from a case charged with the recording media by a transport roller in order of the colored ink jetting portion 110, the colored ink heating portion 111, the colorless ink jetting portion 112, the colorless ink heating portion 113, and the irradiation portion 114 for curing a colorless ink and accumulated in an accumulation port. The transporting may adopt a drum transport method using a drum-like member, a belt transport method, a stage transport method using a stage, and the like, in addition to the method using the transport roller.

At least one roller among a plurality of the transport rollers can be a driving roller to which power of a motor (not shown in the drawing) is conveyed. The driving roller that is rotated by the motor rotates at a constant speed, and thus, the recording medium is transported to a predetermined direction by a predetermined transporting amount.

In the colored ink jetting portion 110, heads for recording (heads for jetting an ink) 130K, 130C, 130M, and 130Y which are connected to each of ink storage units that stores an ink having each of the colors black (K), cyan (C), magenta (M), and yellow (Y) are disposed. In each of the ink storage units that are not shown in the drawing, a colored ink including a coloring agent corresponding to each color tone and an organic solvent is stored, and in a case of recording of an image, the colored ink is supplied to each of the heads for jetting an ink 130K, 130C, 130M, and 130Y as necessary.

The heads for jetting an ink 130K, 130C, 130M, and 130Y respectively jet the colored inks corresponding to an image from a jetting nozzle disposed to face a recording surface of the recording medium. Thus, the ink having each color is applied onto the recording surface of the recording medium, and a color image is recorded.

All of the heads for jetting an ink 130K, 130C, 130M, and 130Y are full-line heads in which a number of jetting ports (nozzles) are arranged along the maximum recording width of an image (maximum recording width) recorded on the recording medium. Image recording on the recording medium can be performed at a higher speed compared to the shuttle system in which recording is performed while reciprocatively scanning a short shuttle head in a width direction of the recording medium (that is, a direction orthogonal to the transport direction in a transport side of the recording medium). In the second embodiment, any one of recording by a serial system and recording by a system in which relatively high-speed recording is possible, for example, a line (single pass) system for forming one line by scanning one time may be adopted, however, according to the ink jet recording device of the second embodiment, a high-quality image with high reproducibility is obtained by the line (single pass) system.

Here, all of the heads for jetting an ink 130K, 130C, 130M, and 130Y have the same structure.

The colored ink heating portion 111 is disposed on the downstream side of the colored ink jetting portion 110 in the transport direction of the recording medium. The colored ink heating portion 111 can be configured by using known heating means such as a heater, blasting means using a blast, such as a dryer, or means obtained by combining these. Examples of the heating means include a method of installing a heat generator such as a heater on a side of the recording medium opposite to a colored ink applying side (for example, in a case where the recording medium is automatically transported, a lower part of a transport mechanism which transports the recording medium by loading the recording medium thereon), a method of exposing the colored ink applying side of the recording medium to warm air or hot air, a heating method of using an infrared heater, and the like, and the heating may be performed by combining a plurality of these methods.

Since a surface temperature of the recording medium changes depending on a kind of the recording medium (quality of the material, thickness, and the like), environmental temperature, and the like, it is preferable to apply the colored ink while controlling the temperature by providing a measuring portion which measures the surface temperature of the recording medium and a control mechanism which performs feedback of a value of the surface temperature of the recording medium measured by the measuring portion to a heating control portion. As the measuring portion which measures the surface temperature of the recording medium, a contact or noncontact thermometer is preferable.

A heating temperature of the colored ink heating portion is maintained such that the surface temperature of the recording medium is 40° C. or higher, and the surface temperature of the recording medium is preferably 40° C. to 100° C. Heating time is preferably 1 second or longer.

The colorless ink jetting portion 112 is disposed on the downstream side of the colored ink heating portion 111 in the transport direction of the recording medium. In the colorless ink jetting portion 112, a head 130T for recording (that is, a head for jetting a colorless ink) which is connected to each of ink storage units that stores a colorless ink (T) is disposed. In the colorless ink storage unit that is not shown in the drawing, the colorless ink including a polymerizable compound, a photopolymerization initiator, and an organic solvent is stored, and the colorless ink is supplied to the head 130T for jetting a colorless ink.

The head 130T for jetting a colorless ink jets the colorless ink from a jetting nozzle disposed to face the recording surface of the recording medium. Thus, the colorless ink is applied onto the colored ink that has been heated.

It is preferable that a nozzle diameter Dc in the colored ink jetting portion and a nozzle diameter Dt in the colorless ink jetting portion k ink satisfy a relationship of Expression (3).

$$Dc \leq Dt \quad \text{Expression (3)}$$

In a case where the nozzle diameter Dc in the colored ink jetting portion and the nozzle diameter Dt in the colorless ink jetting portion k ink satisfy the relationship of Expression (3), the colorless ink easily covers the colored ink. Therefore, the colorless ink is present on the surface of an image that is formed, and an image having excellent abrasion resistance is obtained.

The colorless ink heating portion 113 is disposed on the downstream side of the colorless ink jetting portion 112 in the transport direction of the recording medium. The colorless ink heating portion 113 can have the same configuration as the colored ink heating portion 111.

A heating temperature of the colorless ink heating portion is maintained such that the surface temperature of the recording medium is 40° C. or higher, and the surface temperature of the recording medium is preferably 40° C. to 90° C. Heating time is preferably 1 second or longer.

The irradiation portion 114 for curing a colorless ink is disposed on the downstream side of the colorless ink heating portion 113 in the transport direction of the recording medium. In the irradiation portion 114 for curing a colorless ink, an active energy ray (ultraviolet ray) irradiation lamp performs irradiation with an active energy ray (an ultraviolet ray) and the colorless ink that has been heated is cured. The active energy ray (ultraviolet ray) irradiation lamp irradiates the entire recording surface by a lamp disposed to face the recording surface of the recording medium and performs curing of the entire image. The irradiation portion 114 for curing a colorless ink is not limited to the active energy ray (ultraviolet ray) irradiation lamp, and a halogen lamp, a high-pressure mercury lamp, laser, an LED, an electron beam irradiation device, and the like can be adopted.

In the ink jet recording device, an irradiation portion for curing a colored ink may be provided between the colored ink heating portion 111 and the colorless ink jetting portion 112. The irradiation portion for curing a colored ink can have the same configuration as the irradiation portion 114 for curing a colorless ink.

EXAMPLES

Hereinafter, the present invention will be more specifically described using Examples. The scope of the present invention is not limited to the specific examples shown below. Unless otherwise particularly specified, "part" is based on mass.

<Preparation of Pigment Dispersion>

As a pigment dispersion of each color, pigment mill bases cyan 1, cyan 2, magenta 1, yellow 1, and black 1 were prepared as follows.

Components other than the pigments shown in Table 1 below were mixed such that the mixtures had compositions of Table 1, and stirring was performed using a mixer manufactured by SILVERSON under a condition of 2,000 revolutions/min to 3,000 revolutions/min and for 10 minutes to 15 minutes, so as to obtain homogeneous diluted solutions of a dispersing agent. Each type of pigment indicated in Table 1 was added to the diluted solution of a dispersing agent in an amount indicated in Table 1, and stirring was further performed using the mixer under a condition of 2,000 revolutions/min to 3,000 revolutions/min and for 10 minutes to 20 minutes, so as to obtain 500 parts of a homogeneous preliminary dispersion liquid.

Thereafter, a dispersion treatment was performed on each of the preliminary dispersion liquid thus obtained using a circulation type-beads mill apparatus (DISPERMAT SL-012C1), and the pigment dispersion of each color was obtained. A condition for the dispersion treatment was as follows. The circulation type-beads mill apparatus was filled with 200 parts of zirconia beads having a diameter of 0.65 mm, and a circumferential speed was set to 15 m/s. Dispersing time was set to 1 hour to 6 hours.

"-" in Table 1 indicates that the relevant component is not included.

TABLE 1

| | Pigment mill base cyan 1 | Pigment mill base cyan 2 | Pigment mill base magenta 1 | Pigment mill base yellow 1 | Pigment mill base black 1 |
|---|---|---|---|---|---|
| Pigment | PB15:4 | PB15:4 | Mixed crystal quinacridone | PY155 | Carbon black |
| | 30% by mass | 30% by mass | 30% by mass | 30% by mass | 30% by mass |
| Dispersing agent | Sol32000 | Sol32000 | Sol32000 | Sol32000 | Sol32000 |
| | 10% by mass | 10% by mass | 15% by mass | 10% by mass | 10% by mass |
| DEGDE | 60% by mass | — | 55% by mass | 60% by mass | 60% by mass |
| PEA | — | 59% by mass | — | — | — |
| UV12 | — | 1.0% by mass | — | — | — |

Details of the components in Table 1 are as follows.

PB15:4 . . . C.I. pigment blue 15:4, BASF SE, HELIOGEN BULE D 7110F

Mixed crystal quinacridone . . . BASF SE, CINQUASIA MAGENTA L 4540

PY155 . . . C.I. pigment yellow 155, Clariant International Ltd, INK JET YELLOW 4GC Carbon black . . . CABOT CORPORATION, MOGUL E Sol32000 . . . The Lubrizol Corporation, Solsperse 32000

DEGDE . . . Diethylene glycol diethyl ether, Tokyo Chemical Industry Co., Ltd.

PEA . . . Phenoxyethyl acrylate, Sartomer, SR339C

UV12 Nitroso-based polymerization inhibitor, tris(N-nitroso-N-phenylhydroxylamine) aluminum salt, Kromachem Ltd, FLORSTAB UV12

<Preparation of Ink>

Each of inks was obtained by mixing each component such that the mixtures had compositions indicated in Table 2 to Table 4 (cyan ink) and Table 5 (an ink having each color) below for the colored inks and mixing each component such that the mixtures had compositions indicated in Table 6 to Table 8 below for the colorless inks and by performing stirring of each of the mixtures using a mixer manufactured by SILVERSON under a condition of 2,000 revolutions/min to 3,000 revolutions/min and for 10 minutes to 15 minutes. A numerical value of each of the components in Table 2 to Table 8 is a mass ratio. Surface tension was measured by an automatic surface tensiometer CBVP-Z (Kyowa Interface Science Co., Ltd.) in an environment of a temperature of 25° C.

"Ink" in Table 2 to Table 5 represents a colored ink, "Top" in Table 6 to Table 8 represents a colorless ink, and "-" in each table indicates that the relevant component is not included.

TABLE 2

|  |  | Ink1A SUV | Ink2A SOL | Ink1B SUV | Ink1C SUV |
|---|---|---|---|---|---|
| Pigment mill base cyan 1 | | 5 | 5 | 5 | 5 |
| Pigment mill base cyan 2 | | — | — | — | — |
| Bifunctional oligomer | CN996 Mw 2,850 | 20 | — | 5 | 30 |
| Polymer | VINNOL E 15/45 Mw 50,000 | — | 4 | — | — |
| Organic solvent | DEGDE | 68.8 | 90.8 | 83.8 | 58.8 |
| Monofunctional monomer | NVC | — | — | — | — |
|  | PEA | — | — | — | — |
|  | IBOA | — | — | — | — |
| Polyfunctional monomer | DPGDA | — | — | — | — |
| Photo-polymerization initiator | Irg2959 | 3 | — | 3 | 3 |
|  | Irg819 | 3 | — | 3 | 3 |
| Surfactant | BYK331 | 0.1 | 0.1 | 0.1 | 0.1 |
| Polymerization inhibitor | UV12 | 0.1 | 0.1 | 0.1 | 0.1 |
| Surface tension (mN/m) | | 29.6 | 29.4 | 29.5 | 29.6 |

TABLE 3

|  |  | Ink1D SUV | Ink1E SUV | Ink1F SUV | Ink2B SOL | Ink2C SOL | Ink2D SOL | Ink2E SOL | Ink2F SOL |
|---|---|---|---|---|---|---|---|---|---|
| Pigment mill base cyan 1 | | 5 | 5 | 5 | 5 | 5 | 5 | 5 | 5 |
| Bifunctional oligomer | CN996 Mw 2,850 | 15 | 10 | 5 | — | — | — | — | — |
| Hexafunctional oligomer | SHIKOH UV-7630B Mw 2,200 | 5 | 10 | 15 | — | — | — | — | — |
| Polymer | VINNOL E 15/45 MW 50,000 | — | — | — | 2 | 6 | — | — | — |
|  | Elvacite 4099 Mw 15,000 | — | — | — | — | — | 4 | — | — |
|  | Elvacite 2013 Mw 34,000 | — | — | — | — | — | — | 4 | — |
|  | Elvacite 2014 Mw 119,000 | — | — | — | — | — | — | — | 4 |
| Organic solvent | DEGDE | 68.8 | 68.8 | 68.8 | 92.8 | 88.8 | 90.8 | 90.8 | 90.8 |
| Photopolymerization initiator | Irg2959 | 3 | 3 | 3 | 0 | 0 | 0 | 0 | 0 |
|  | Irg819 | 3 | 3 | 3 | 0 | 0 | 0 | 0 | 0 |
| Surfactant | BYK331 | 0.1 | 0.1 | 0.1 | 0.1 | 0.1 | 0.1 | 0.1 | 0.1 |
| Polymerization inhibitor | UV12 | 0.1 | 0.1 | 0.1 | 0.1 | 0.1 | 0.1 | 0.1 | 0.1 |
| Surface tension (mN/m) | | 29.5 | 29.6 | 29.3 | 29.4 | 29.5 | 29.6 | 29.3 | 29.4 |

TABLE 4

|  |  | Ink1G SUV | Ink1H SUV | Ink1I SUV | Ink1J SUV | Ink1K SUV | Ink1L SUV |
|---|---|---|---|---|---|---|---|
| Pigment mill base cyan 1 | | 5 | 5 | 5 | 5 | 5 | 5 |
| Bifunctional oligomer | CN996 Mw 2,850 | 15 | 30 | — | — | — | — |
|  | UA-122P Mw 1,100 | — | — | 20 | — | — | — |
|  | SHIKOH UV-6630B Mw 3,000 | — | — | — | 20 | — | — |
|  | SHIKOH UV-3310B Mw 5,000 | — | — | — | — | 20 | — |
|  | SHIKOH UV-3000B Mw 18,000 | — | — | — | — | — | 20 |
| Photopolymerization initiator | Irg2959 | 3 | 3 | 3 | 3 | 3 | 3 |
|  | Irg819 | 3 | 3 | 3 | 3 | 3 | 3 |
| Surfactant | BYK331 | 0.1 | 0.1 | 0.1 | 0.1 | 0.1 | 0.1 |
| Polymerization inhibitor | UV12 | 0.1 | 0.1 | 0.1 | 0.1 | 0.1 | 0.1 |
| Organic solvent | DEGDE | 73.8 | 58.8 | 68.8 | 68.8 | 68.8 | 68.8 |
| Surface tension (mN/m) | | 29.5 | 29.6 | 29.7 | 29.3 | 29.4 | 29.5 |

TABLE 5

|  |  | Ink1A SUV | Ink4A SUV | Ink5A SUV | Ink6A SUV |
|---|---|---|---|---|---|
| Pigment mill base cyan 1 | | 5 | — | — | — |
| Pigment mill base magenta 1 | | — | 12 | — | — |
| Pigment mill base yellow 1 | | — | — | 10 | — |
| Pigment mill base black 1 | | — | — | — | 5 |
| Bifunctional oligomer | CN996 Mw 2,850 | 20 | 20 | 20 | 20 |
| Organic solvent | DEGDE | 68.8 | 61.8 | 63.8 | 68.8 |
| Photopolymerization initiator | Irg2959 | 3 | 3 | 3 | 3 |
|  | Irg819 | 3 | 3 | 3 | 3 |
| Surfactant | BYK331 | 0.1 | 0.1 | 0.1 | 0.1 |
| Polymerization inhibitor | UV12 | 0.1 | 0.1 | 0.1 | 0.1 |
| Surface tension (mN/m) | | 29.5 | 29.6 | 29.7 | 29.3 |

TABLE 6

|  |  | Top1A SUV | Top2A SOL | Top3A UV | Top1B SUV | Top1C SUV | Top1D SUV |
|---|---|---|---|---|---|---|---|
| Bifunctional oligomer | CN996 Mw 2,850 | 10 | — | — | 15 | 7.5 | 5 |
| Hexafunctional oligomer | SHIKOH UV-7630B Mw 2,200 | 5 | — | — | — | 7.5 | 10 |
| Polymer | VINNOL E 15/45 Mw 50,000 | — | 4 | — | — | — | — |
| Organic solvent | DEGDE | 78.3 | 95.3 | 0 | 78.3 | 78.3 | 78.3 |
| Monofunctional monomer | NVC | — | — | 15 | — | — | — |
|  | IBOA | — | — | 30 | — | — | — |
| Polyfunctional monomer | DPGDA | — | — | 48.3 | — | — | — |
| Photopolymerization initiator | Irg2959 | 3 | — | 3 | 3 | 3 | 3 |
|  | Irg819 | 3 | — | 3 | 3 | 3 | 3 |
| Acrylic modified polyorganosiloxane | CHALINE R175S | 0.5 | 0.5 | 0.5 | 0.5 | 0.5 | 0.5 |
| Surfactant | BYK331 | 0.1 | 0.1 | 0.1 | 0.1 | 0.1 | 0.1 |
| Polymerization inhibitor | UV12 | 0.1 | 0.1 | 0.1 | 0.1 | 0.1 | 0.1 |
| Surface tension (mN/m) |  | 24.3 | 24.2 | 24.2 | 24.1 | 24.1 | 24.2 |

TABLE 7

|  |  | Top1E SUV | Top1F SUV | Top1G SUV | Top1H SUV | Top1I SUV | Top1J SUV | Top1K SUV |
|---|---|---|---|---|---|---|---|---|
| Bifunctional oligomer | CN996 Mw 2,850 | 10 | 33.3 | 7.3 | 10 | 10 | 10 | 10 |
| Hexafunctional oligomer | SHIKOH UV-7630B Mw 2,200 | 5 | 10 | 1 | 5 | 5 | 5 | 5 |
| Organic solvent | MEK Bp 79.5° C. | — | — | — | 78.3 | — | — | — |
|  | EGMME Bp 125° C. | — | — | — | — | 78.3 | — | — |
|  | 3-Methoxybutyl acetate Bp 173° C. | 78.3 | 50 | 85 | — | — | — | — |
|  | γ-Butyrolactone Bp 204° C. | — | — | — | — | — | 78.3 | — |
|  | TEGMBE Bp 278° C. | — | — | — | — | — | — | 78.3 |
| Photopolymerization initiator | Irg2959 | 3 | 3 | 3 | 3 | 3 | 3 | 3 |
|  | Irg819 | 3 | 3 | 3 | 3 | 3 | 3 | 3 |
| Acrylic modified polyorganosiloxane | CHALINE R175S | 0.5 | 0.5 | 0.5 | 0.5 | 0.5 | 0.5 | 0.5 |
| Surfactant | BYK331 | 0.1 | 0.1 | 0.1 | 0.1 | 0.1 | 0.1 | 0.1 |
| Polymerization inhibitor | UV12 | 0.1 | 0.1 | 0.1 | 0.1 | 0.1 | 0.1 | 0.1 |
| Surface tension (mN/m) |  | 24.3 | 24.1 | 24.1 | 24.3 | 24.2 | 24.3 | 24.2 |

TABLE 8

|  |  | Top1L SUV | Top1M SUV | Top1N SUV | Top1O SUV |
|---|---|---|---|---|---|
| Bifunctional oligomer | CN996 Mw 2,850 | 10 | 10 | 10 | 10 |
| Hexafunctional oligomer | SHIKOH UV-7630B Mw 2,200 | 5 | 5 | 5 | 5 |
| Organic solvent | DEGDE | 78.9 | 78.8 | 78 | 77 |
| Photopolymerization initiator | Irg2959 | 3 | 3 | 3 | 3 |
|  | Irg819 | 3 | 3 | 3 | 3 |
| Acrylic modified polyorganosiloxane | CHALINE R175S | — | 0.2 | 1 | 2 |
| Polymerization inhibitor | UV12 | 0.1 | — | — | — |
| Surface tension (mN/m) |  | 24.2 | 24.3 | 24.2 | 24.3 |

Details of the components in Table 2 to Table 8 are as follows.

CN996 . . . Bifunctional oligomer, urethane acrylate, weight-average molecular weight (Mw)=2,850, Sartomer UA-122P . . . Bifunctional oligomer, urethane acrylate, MW=1,100, Shin Nakamura Chemical Co., Ltd.

SHIKOH (registered trademark) UV-6630B . . . Bifunctional oligomer, urethane acrylate, Mw=3,000, The Nippon Synthetic Chemical Industry Co., Ltd.

SHIKOH (registered trademark) UV-3310B . . . Bifunctional oligomer, urethane acrylate, Mw=5,000, The Nippon Synthetic Chemical Industry Co., Ltd.

SHIKOH (registered trademark) UV-7630B . . . Hexafunctional oligomer, Mw=2,200, The Nippon Synthetic Chemical Industry Co., Ltd.

SHIKOH (registered trademark) UV-3000B . . . Bifunctional oligomer, Mw=18,000, The Nippon Synthetic Chemical Industry Co., Ltd.

VINNOL (registered trademark) E15/45 . . . Polymer, copolymer of vinyl chloride and vinyl acetate, Mw=50,000, Wacker Chemie AG Elvacite 4099 . . . Polymer, copolymer of methyl methacrylate and n-butyl methacrylate, Mw=15,000, Lucite International Elvacite 2013 . . . Polymer, copolymer of methyl methacrylate and n-butyl methacrylate, Mw=34,000, Lucite International Elvacite 2014 . . . Polymer, copolymer of methyl methacrylate and n-butyl methacrylate, Mw=119,000, Lucite International DEGDE . . . Organic solvent, diethylene glycol diethyl ether, boiling point=188° C.

MEK . . . Organic solvent, methyl ethyl ketone, boiling point=79.5° C.

EGMME . . . Organic solvent, ethylene glycol monomethyl ether, boiling point=125° C.

3-Methoxybutyl acetate . . . Organic solvent, boiling point=173° C.

γ-Butyrolactone . . . Organic solvent, boiling point=204° C.

TEGMBE . . . Organic solvent, triethylene glycol monobutyl ether, boiling point=278° C.

NVC Monofunctional monomer, N-vinyl caprolactam, BASF SE

PEA . . . Monofunctional monomer, phenoxyethyl acrylate, Sartomer, SR339C

IBOA . . . Monofunctional monomer, isobornyl acrylate, Sartomer, SR5-6D

DPGDA . . . Polyfunctional monomer, dipropylene glycol diacrylate

Irg2959 . . . Photopolymerization initiator, BASF SE, IRGACURE2959

Irg819 . . . Photopolymerization initiator, BASF SE, IRGACURE819

CHALINE R175S . . . Acrylic modified polyorganosiloxane, Nissin Chemical Co., Ltd.

BYK (registered trademark) 331 . . . Surfactant, BYK-Chemie GmbH

UV12 Nitroso-based polymerization inhibitor, tris(N-nitroso-N-phenylhydroxylamine) aluminum salt, Kromachem Ltd, FLORSTAB UV12

<Ink Jet Recording Device>

As the ink jet recording device of the second embodiment, a device obtained by mounting a rubber heater (manufactured by ThreeHigh Co., Ltd.) and an ultraviolet (UV) irradiation device (manufactured by Integration Technology Ltd) on an ink jet printer (KEGON) manufactured by Afit Corporation was prepared.

An output of the rubber heater was set such that the surface temperature of the recording medium can be increased from 40° C. to 100° C. Time taken from ink jet droplet landing to UV exposure corresponds to heating time of a liquid droplet, and a transport speed (5 m/min to 25 m/min) and timing of opening and closing of a UV shutter were adjusted such that the heating time can be changed between 0.5 seconds to 60 seconds.

<Ink Jet Recording Method>

Figure 4:
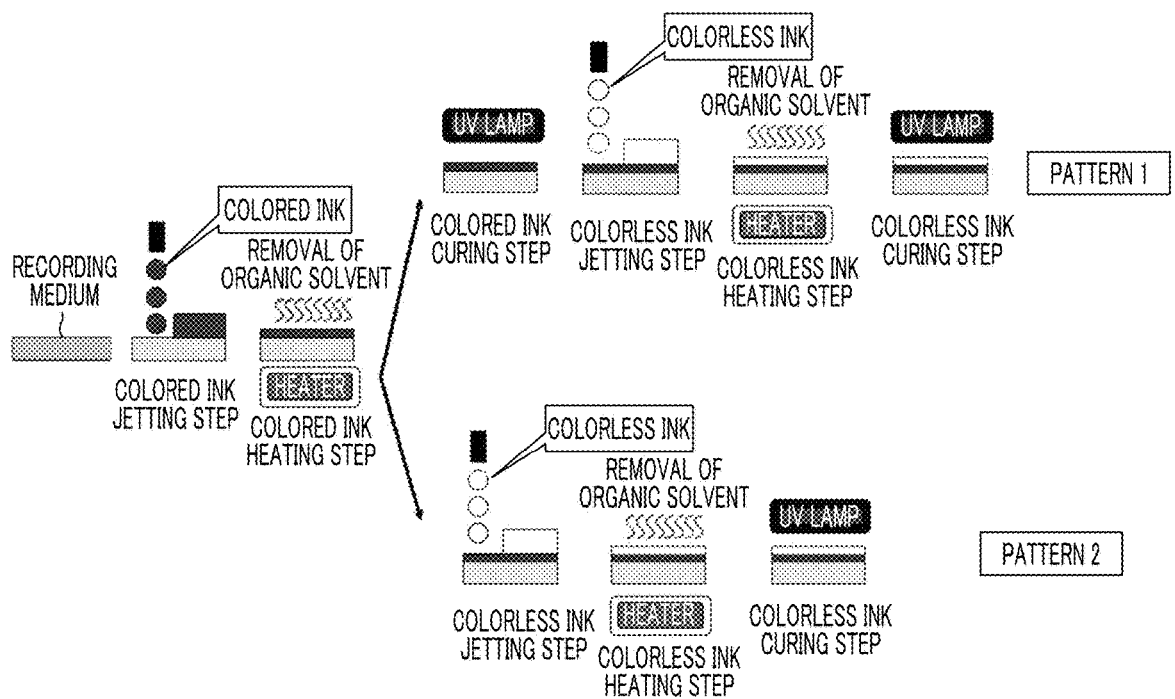
FIG. 4 is a schematic view showing patterns of ink jet recording methods in Examples.

Image forming was performed by the configurations of the following two patterns. Each of the configurations are as follows. A schematic view of the following pattern 1 and pattern 2 are shown in FIG. 4.

The following pattern 1 proceeds in order of the colored ink jetting step, the colored ink heating step, the colored ink curing step, the colorless ink jetting step, the colorless ink heating step, and the colorless ink curing step.

The following pattern 2 proceeds in order of the colored ink jetting step, the colored ink heating step, the colorless ink jetting step, the colorless ink heating step, and the colorless ink curing step.

The pattern 1 is applied in an example in which a colored SUV ink is used as the colored ink, and the pattern 2 is applied in an example in which a colored SOL ink is used as the colored ink.

(Pattern 1)

Colored Ink Jetting Step:

The colored ink was jetted onto PVC leather (CUPPUCCINO CP-830, YAMAPLAS CO., LTD.) from an ink jet head (TOSHIBA TEC CORPORATION, CA4, nozzle diameter of 26 μm) heated to 35° C. such that an image density became 1,200 dpi×600 dpi (dots per inch). In this case, a voltage was adjusted such that an application amount of the colored ink became 20 g per 1 $m^2$. Application of the colored ink was set such that the width was 500 mm.

Colored Ink Heating Step:

Heating was performed with the rubber heater such that the surface temperature of the recording medium became 40° C. to 100° C. As described above, the heating time was set between 0.5 seconds to 60 seconds.

Colored Ink Curing Step:

The colored ink was exposed to light at an irradiation amount of 3,000 mJ/$cm^2$ with a UV exposure device (UV lamp) which was a light source for performing irradiation with an active energy ray.

Colorless Ink Jetting Step:

The colorless ink was jetted onto the colored ink from an ink jet head (TOSHIBA TEC CORPORATION, CA4, nozzle diameter of 26 μm) heated to 35° C. such that an image density became 1,200 dpi×600 dpi. In this case, a voltage was adjusted such that an application amount of the colorless ink became 10 g per 1 $m^2$. Application of the colorless ink was set such that the width was 500 mm.

Colorless Ink Heating Step:

Heating was performed with the rubber heater such that the surface temperature of the recording medium became 40° C. to 100° C. As described above, the heating time was set between 0.5 seconds to 60 seconds.

Colorless Ink Curing Step:

The colorless ink was exposed to light at an irradiation amount of 3,000 mJ/$cm^2$ with a UV exposure device (UV lamp) which was a light source for performing irradiation with an active energy ray.

(Pattern 2)

Colored Ink Jetting Step:

The colored ink was jetted onto PVC leather (CUPPUCCINO CP-830, YAMAPLAS CO., LTD.) from an ink jet head (TOSHIBA TEC CORPORATION, CA4, nozzle diameter of 26 nm) heated to 35° C. such that an image density became 1,200 dpi×600 dpi. In this case, a voltage was adjusted such that an application amount of the colored ink became 20 g per 1 $m^2$. Application of the colored ink was set such that the width was 500 mm.

Colored Ink Heating Step:

Heating was performed with the rubber heater such that the surface temperature of the recording medium became 40° C. to 100° C. As described above, the heating time was set between 0.5 seconds to 60 seconds.

Colorless Ink Jetting Step:

The colorless ink was jetted onto the colored ink from an ink jet head (TOSHIBA TEC CORPORATION, CA4, nozzle diameter of 26 nm) heated to 35° C. such that an image density became 1,200 dpi×600 dpi. In this case, a voltage was adjusted such that an application amount of the colorless ink became 10 g per 1 $m^2$. Application of the colorless ink was set such that the width was 500 mm.

Colorless Ink Heating Step:

Heating was performed with the rubber heater such that the surface temperature of the recording medium became 40° C. to 100° C. As described above, the heating time was set between 0.5 seconds to 60 seconds.

Colorless Ink Curing Step:

The colorless ink was exposed to light at an irradiation amount of 3,000 mJ/cm$^2$ with a UV exposure device (UV lamp) which was a light source for performing irradiation with an active energy ray.

[Evaluation]

The ink jet recording device described above was filled with each of the inks having the compositions indicated in Table 2 to Table 8 in the combinations indicated in Table 9 to Table 17 below, and cyan solid images (Example 1 to Example 42 and Comparative Example 1 to Comparative Example 7) and an image of a checked pattern of four colors, cyan, magenta, yellow, and black (Example 43) was formed by the ink jet recording method of the pattern 1 or the pattern 2. A recording medium on which the image was formed was used as a sample. Heating conditions in the colored ink heating step and the colorless ink heating step in each of Examples and Comparative Examples are as indicated in Table 9 to Table 17.

Abrasion resistance, bending properties, chemical resistance, adhesiveness, image bleeding, image dulling, and banding unevenness of the obtained samples were evaluated according to the following evaluation standards. Evaluation results are shown in Table 9 to Table 17.

1) Abrasion Resistance

The image of each sample was subjected to abrasion a certain number of times using a Gakushin tester (cotton (dried), 400 g load/Suga Test Instruments Co., Ltd.), and the number of times of the abrasion at which a scratch on the image of each sample was able to be visually recognized was recorded. Evaluation was performed according to the following standard. Three points or higher are the passing points.

5 points: A scratch was not generated even after performing the abrasion 20,000 times.

4 points: A scratch was generated by performing the abrasion 10,000 or more times and less than 20,000 times.

3 points: A scratch was generated by performing the abrasion 5,000 or more times and less than 10,000 times.

2 points: A scratch was generated by performing the abrasion 1,000 or more times and less than 5,000 times.

1 point: A scratch was generated by performing the abrasion less than 1,000 times.

2) Bending Properties

Each sample was subjected to bending a certain number of times using a bending tester (FLEXO-METER/manufactured by YASUDA SEIKI SEISAKUSHO, LTD.), and the number of times of the bending at which a crack on the image of each sample was able to be visually recognized was recorded. Evaluation was performed according to the following standard. Three points or higher are the passing points.

5 points: A crack was not generated even after performing the bending 20,000 times.

4 points: A crack was generated by performing the bending 10,000 or more times and less than 20,000 times.

3 points: A crack was generated by performing the bending 5,000 or more times and less than 10,000 times.

2 points: A crack was generated by performing the bending 1,000 or more times and less than 5,000 times.

1 point: A crack was generated by performing the bending less than 1,000 times.

3) Chemical Resistance

The image of each sample was subjected to abrasion a certain number of times using a Gakushin tester (cotton (immersed in ethanol), 400 g load/Suga Test Instruments Co., Ltd.), and the number of times of the abrasion at which the image was peeled off, and the surface of the recording medium was able to be visually recognized was recorded. Evaluation was performed according to the following standard. Three points or higher are the passing points.

5 points: The surface of the recording medium cannot be visually recognized even after performing the abrasion 200 times.

4 points: The surface of the recording medium can be visually recognized by performing the abrasion 100 or more times and less than 200 times.

3 points: The surface of the recording medium can be visually recognized by performing the abrasion 50 or more times and less than 100 times.

2 points: The surface of the recording medium can be visually recognized by performing the abrasion 10 or more times and less than 50 times.

1 point: The surface of the recording medium can be visually recognized by performing the abrasion less than 10 times.

4) Adhesiveness

A cross-cut test was performed on the image of each sample according to the procedure described in JIS K 5066-5-6:1992, and a tape side was visually checked. Evaluation was performed according to the following standard.

5 points: No transfer to the tape at all 4 points: Transfer to the tape occurs in a granular form, however, two or less is transferred, and clear transfer to the tape in a film form does not occur.

3 points: Transfer to the tape occurs in a granular form, however, three or four are transferred, and clear transfer to the tape in a film form does not occur.

2 points: Transfer to the tape occurs in a granular form, however, five or more are transferred, and clear transfer to the tape in a film form does not occur.

1 point: Clear transfer to the tape in a film form occurs.

5) Image Bleeding

A set width (500 mm) and a width of the image of each of Examples and Comparative Examples which was actually formed were compared, and image bleeding was evaluated from an amount by which the width of the image increased, according to the following evaluation standard. It is evaluated that the less the width of the image increases, the more image bleeding is suppressed, which is a favorable result.

5 points: Increase in the width of the image was 0.1 mm or less.

4 points: Increase in the width of the image was more than 0.1 mm and 0.5 mm or less.

3 points: Increase in the width of the image was more than 0.5 mm and 1 mm or less.

2 points: Increase in the width of the image was more than 1 mm and less than 2 mm.

1 point: Increase in the width of the image was 2 mm or more.

6) Image Dulling

In a case where image dulling occurs, decrease in color density (O.D) occurs. The color density of the image of each sample was measured (SpectroEye, manufactured by X-Rite, Incorporated.), and evaluation was performed according to the following standard.

5 points: O.D was 1.8 or greater.

4 points: O.D was 1.78 or greater and less than 1.8.

3 points: O.D was 1.75 or greater and less than 1.78.

2 points: O.D was 1.70 or greater and less than 1.75.

1 point: O.D was less than 1.70.

7) Banding Unevenness

In sensory evaluation performed by ten evaluators, whether banding unevenness (unevenness of banding) was generated in the image of each sample was evaluated according to the following standard.

5 points: All of the ten evaluators evaluated that banding unevenness was not generated.

4 points: One evaluator evaluated that banding unevenness was generated.

3 points: Two evaluators evaluated that banding unevenness was generated.

2 points: Three evaluators evaluated that banding unevenness was generated.

1 point: Four or more evaluators evaluated that banding unevenness was generated.

TABLE 9

|  | Example 1 | Comparative Example 1 | Comparative Example 2 | Comparative Example 3 | Comparative Example 4 | Comparative Example 5 | Comparative Example 6 | Comparative Example 7 | Example 2 |
|---|---|---|---|---|---|---|---|---|---|
| Colored ink jetting step | Ink1A (SUV) | Ink1A (SUV) | Ink1A (SUV) | Ink1A (SUV) | Ink1A (SUV) | Ink1A (SUV) | Ink1A (SUV) | Ink1A (SUV) | Ink2A (SOL) |
| Colored ink heating step | 60° C., 10 seconds | Not performed | Not performed | 60° C., 10 seconds | 60° C., 10 seconds | 60° C., 10 seconds | 60° C., 10 seconds | 60° C., 10 seconds | 60° C., 2 seconds |
| Colored ink curing step | Performed | Not performed | Performed | Not performed | Not performed | Performed | Performed | Not performed | Not performed |
| Colorless ink jetting step | Top1A (SUV) | Top1A (SUV) | Top1A (SUV) | Top1A (SUV) | Not performed | Top1A (SUV) | Top2A (SOL) | Top3A (UV) | Top1A (SUV) |
| Colorless ink heating step | 60° C., 10 seconds | 60° C., 10 seconds | 60° C., 10 seconds | Not performed | Not performed | Not performed | 60° C., 10 seconds | 60° C., 10 seconds | 60° C., 10 seconds |
| Colorless ink curing step | Performed | Performed | Performed | Performed | Performed | Performed | Not performed | Performed | Performed |
| Abrasion resistance | 5 | 2 | 2 | 2 | 1 | Surface is sticky, and evaluation cannot be performed | 2 | 4 | 4 |
| Bending properties | 5 | 5 | 5 | 5 | 5 |  | 5 | 1 | 5 |
| Chemical resistance | 5 | 2 | 2 | 2 | 1 |  | 1 | 5 | 4 |
| Adhesiveness | 4 | 2 | 2 | 2 | 5 |  | 5 | 5 | 4 |
| Image bleeding | 5 | 1 | 1 | 5 | 5 |  | 5 | 5 | 3 |
| Image dulling | 5 | 1 | 1 | 1 | 5 |  | 5 | 5 | 5 |
| Banding unevenness | 5 | 5 | 5 | 5 | 5 |  | 5 | 5 | 5 |

TABLE 10

|  | Example 1 | Example 3 | Example 4 | Example 5 | Example 6 | Example 7 | Example 8 |
|---|---|---|---|---|---|---|---|
| Colored ink jetting step | Ink1A | Ink1A | Ink1A | Ink1A | Ink1A | Ink1B | Ink1C |
| Content of bifunctional oligomer (% by mass) | 20 | 20 | 20 | 20 | 20 | 5 | 30 |
| Colored ink heating step | 60° C., 10 seconds | 60° C., 5 seconds | 60° C., 3 seconds | 40° C., 5 seconds | 100° C., 5 seconds | 60° C., 10 seconds | 60° C., 10 seconds |
| Colored ink curing step | Performed | Performed | Performed | Performed | Performed | Performed | Performed |
| Colorless ink jetting step | Top1A | Top1A | Top1A | Top1A | Top1A | Top1A | Top1A |
| Colorless ink heating step | 60° C., 10 seconds | 60° C., 10 seconds | 60° C., 10 seconds | 60° C., 10 seconds | 60° C., 10 seconds | 60° C., 10 seconds | 60° C., 10 seconds |
| Colorless ink curing step | Performed | Performed | Performed | Performed | Performed | Performed | Performed |
| Abrasion resistance | 5 | 5 | 3 | 3 | 5 | 5 | 5 |
| Bending properties | 5 | 5 | 5 | 5 | 5 | 5 | 3 |
| Chemical resistance | 5 | 5 | 3 | 3 | 5 | 5 | 5 |
| Adhesiveness | 4 | 4 | 3 | 3 | 4 | 4 | 3 |
| Image bleeding | 5 | 5 | 3 | 3 | 5 | 3 | 5 |
| Image dulling | 5 | 5 | 3 | 3 | 5 | 3 | 5 |
| Banding unevenness | 5 | 5 | 5 | 5 | 3 | 5 | 5 |

TABLE 11

|  | Example 9 | Example 10 | Example 11 | Example 12 | Example 13 |
|---|---|---|---|---|---|
| Colored ink jetting step | Ink1A | Ink1A | Ink1A | Ink1A | Ink1A |
| Colored ink heating step | 60° C., 2 seconds | 60° C., 1 second | 60° C., 0.5 seconds | 40° C., 2 seconds | 100° C., 2 seconds |
| Colored ink curing step | Performed | Performed | Performed | Performed | Performed |
| Colorless ink jetting step | Top1A | Top1A | Top1A | Top1A | Top1A |
| Colorless ink heating step | 60° C., 10 seconds | 60° C., 10 seconds | 60° C., 10 seconds | 60° C., 10 seconds | 60° C., 10 seconds |
| Colorless ink curing step | Performed | Performed | Performed | Performed | Performed |
| Abrasion resistance | 3 | 3 | 3 | 3 | 5 |
| Bending properties | 5 | 5 | 5 | 5 | 5 |
| Chemical resistance | 3 | 3 | 3 | 3 | 5 |
| Adhesiveness | 3 | 3 | 3 | 3 | 5 |

TABLE 11-continued

|  | Example 9 | Example 10 | Example 11 | Example 12 | Example 13 |
|---|---|---|---|---|---|
| Image bleeding | 3 | 3 | 3 | 3 | 5 |
| Image dulling | 3 | 3 | 3 | 3 | 3 |
| Banding unevenness | 5 | 5 | 5 | 5 | 4 |

TABLE 12

|  | Example 1 | Example 14 | Example 15 | Example 16 | Example 17 | Example 18 | Example 19 |
|---|---|---|---|---|---|---|---|
| Colored ink jetting step | Ink1A | Ink1D | Ink1E | Ink1F | Ink1A | Ink1A | Ink1A |
| Bifunctional oligomer:hexafunctional oligomer | 20:0 | 15:5 | 10:10 | 5:15 | 20:0 | 20:0 | 20:0 |
| Colored ink heating step | 60° C., 10 seconds | 60° C., 10 seconds | 60° C., 10 seconds | 60° C., 10 seconds | 60° C., 10 seconds | 60° C., 10 seconds | 60° C., 10 seconds |
| Colored ink curing step | Performed | Performed | Performed | Performed | Performed | Performed | Performed |
| Colorless ink jetting step | Top1A | Top1A | Top1A | Top1A | Top1B | Top1C | Top1D |
| Bifunctional oligomer:hexafunctional oligomer | 10:5 | 10:5 | 10:5 | 10:5 | 15:0 | 7.5:7.5 | 5:10 |
| Colorless ink heating step | 60° C., 10 seconds | 60° C., 10 seconds | 60° C., 10 seconds | 60° C., 10 seconds | 60° C., 10 seconds | 60° C., 10 seconds | 60° C., 10 seconds |
| Colorless ink curing step | Performed | Performed | Performed | Performed | Performed | Performed | Performed |
| Abrasion resistance | 5 | 5 | 5 | 5 | 4 | 5 | 5 |
| Bending properties | 5 | 4 | 3 | 3 | 5 | 4 | 3 |
| Chemical resistance | 5 | 5 | 5 | 5 | 4 | 5 | 5 |
| Adhesiveness | 4 | 4 | 4 | 3 | 4 | 4 | 3 |
| Image bleeding | 5 | 5 | 5 | 5 | 5 | 5 | 5 |
| Image dulling | 5 | 5 | 5 | 5 | 5 | 5 | 5 |
| Banding unevenness | 5 | 5 | 5 | 5 | 5 | 5 | 5 |

TABLE 13

|  | Example 20 | Example 21 | Example 22 | Example 23 | Example 24 | Example 25 |
|---|---|---|---|---|---|---|
| Colored ink jetting step | Ink2A | Ink2B | Ink2C | Ink2D | Ink2E | Ink2F |
| Mw of polymer | 50,000 | 50,000 | 50,000 | 15,000 | 34,000 | 119,000 |
| Content of polymer (% by mass) | 4 | 2 | 6 | 4 | 4 | 4 |
| Colored ink heating step | 60° C., 4 seconds | 60° C., 4 seconds | 60° C., 4 seconds | 60° C., 4 seconds | 60° C., 4 seconds | 60° C., 4 seconds |
| Colored ink curing step | Not performed | Not performed | Not performed | Not performed | Not performed | Not performed |
| Colorless ink jetting step | Top1A | Top1A | Top1A | Top1A | Top1A | Top1A |
| Colorless ink heating step | 60° C., 10 seconds | 60° C., 10 seconds | 60° C., 10 seconds | 60° C., 10 seconds | 60° C., 10 seconds | 60° C., 10 seconds |
| Colorless ink curing step | Performed | Performed | Performed | Performed | Performed | Performed |
| Abrasion resistance | 4 | 3 | 4 | 3 | 4 | 4 |
| Bending properties | 5 | 5 | 3 | 5 | 5 | 3 |
| Chemical resistance | 4 | 3 | 4 | 3 | 4 | 4 |
| Adhesiveness | 4 | 3 | 4 | 3 | 4 | 4 |
| Image bleeding | 4 | 3 | 4 | 3 | 4 | 4 |
| Image dulling | 5 | 5 | 5 | 5 | 5 | 5 |
| Banding unevenness | 5 | 5 | 5 | 5 | 5 | 5 |

TABLE 14

|  | Example 1 | Example 26 | Example 27 | Example 28 | Example 29 | Example 30 | Example 31 |
|---|---|---|---|---|---|---|---|
| Colored ink jetting step | Ink1A | Ink1G | Ink1H | Ink1I | Ink1J | Ink1K | Ink1L |
| Mw of bifunctional oligomer | 2,850 | 2,850 | 2,850 | 1,100 | 3,000 | 5,000 | 18,000 |
| Content of bifunctional oligomer (% by mass) | 20 | 15 | 30 | 20 | 20 | 20 | 20 |
| Colored ink heating step | 60° C., 10 seconds | 60° C., 10 seconds | 60° C., 10 seconds | 60° C., 10 seconds | 60° C., 10 seconds | 60° C., 10 seconds | 60° C., 10 seconds |
| Colored ink curing step | Performed | Performed | Performed | Performed | Performed | Performed | Performed |
| Colorless ink jetting step | Top1A | Top1A | Top1A | Top1A | Top1A | Top1A | Top1A |
| Colorless ink heating step | 60° C., 10 seconds | 60° C., 10 seconds | 60° C., 10 seconds | 60° C., 10 seconds | 60° C., 10 seconds | 60° C., 10 seconds | 60° C., 10 seconds |
| Colorless ink curing step | Performed | Performed | Performed | Performed | Performed | Performed | Performed |
| Abrasion resistance | 5 | 4 | 5 | 3 | 5 | 5 | 5 |
| Bending properties | 5 | 5 | 4 | 5 | 5 | 5 | 5 |
| Chemical resistance | 5 | 4 | 5 | 3 | 5 | 5 | 5 |
| Adhesiveness | 4 | 5 | 4 | 5 | 4 | 4 | 3 |

TABLE 14-continued

|  | Example 1 | Example 26 | Example 27 | Example 28 | Example 29 | Example 30 | Example 31 |
|---|---|---|---|---|---|---|---|
| Image bleeding | 5 | 3 | 5 | 3 | 5 | 5 | 5 |
| Image dulling | 5 | 5 | 5 | 5 | 5 | 5 | 5 |
| Banding unevenness | 5 | 5 | 3 | 5 | 5 | 5 | 3 |

TABLE 15

|  | Example 1 | Example 32 | Example 33 | Example 34 | Example 35 | Example 36 | Example 37 | Example 38 |
|---|---|---|---|---|---|---|---|---|
| Colored ink jetting step | Ink1A | Ink1A | Ink1A | Ink1A | Ink1A | Ink1A | Ink1A | Ink1A |
| Boiling point of organic solvent (° C.) | 188 | 188 | 188 | 188 | 188 | 188 | 188 | 188 |
| Content of organic solvent (% by mass) | 68.8 | 68.8 | 68.8 | 68.8 | 68.8 | 68.8 | 68.8 | 68.8 |
| Colored ink heating step | 60° C., 10 seconds | 60° C., 10 seconds | 60° C., 10 seconds | 60° C., 10 seconds | 60° C., 10 seconds | 60° C., 10 seconds | 60° C., 10 seconds | 60° C., 10 seconds |
| Colored ink curing step | Performed | Performed | Performed | Performed | Performed | Performed | Performed | Performed |
| Colorless ink jetting step | Top1A | Top1E | Top1F | Top1G | Top1H | Top1I | Top1J | Top1K |
| Boiling point of organic solvent (° C.) | 188 | 173 | 173 | 173 | 79.5 | 125 | 204 | 278 |
| Content of organic solvent (% by mass) | 78.3 | 78.3 | 50 | 85 | 78.3 | 78.3 | 78.3 | 78.3 |
| Colorless ink heating step | 60° C., 10 seconds | 60° C., 10 seconds | 60° C., 10 seconds | 60° C., 10 seconds | 60° C., 10 seconds | 60° C., 10 seconds | 60° C., 10 seconds | 60° C., 10 seconds |
| Colorless ink curing step | Performed | Performed | Performed | Performed | Performed | Performed | Performed | Performed |
| Abrasion resistance | 5 | 5 | 5 | 5 | 5 | 5 | 5 | 5 |
| Bending properties | 5 | 5 | 5 | 5 | 5 | 5 | 5 | 5 |
| Chemical resistance | 5 | 5 | 5 | 5 | 5 | 5 | 5 | 5 |
| Adhesiveness | 4 | 3 | 3 | 5 | 3 | 3 | 5 | 5 |
| Image bleeding | 5 | 5 | 5 | 3 | 5 | 5 | 5 | 3 |
| Image dulling | 5 | 5 | 5 | 5 | 5 | 5 | 4 | 3 |
| Banding unevenness | 5 | 5 | 5 | 5 | 3 | 4 | 5 | 5 |

TABLE 16

|  | Example 1 | Example 39 | Example 40 | Example 41 | Example 42 |
|---|---|---|---|---|---|
| Colored ink jetting step | Ink1A | Ink1A | Ink1A | Ink1A | Ink1A |
| Colored ink heating step | 60° C., 10 seconds | 60° C., 10 seconds | 60° C., 10 seconds | 60° C., 10 seconds | 60° C., 10 seconds |
| Colored ink curing step | Performed | Performed | Performed | Performed | Performed |
| Colorless ink jetting step | Top1A | Top1L | Top1M | Top1N | Top1O |
| Content of acrylic modified polyorganosiloxane (% by mass) | 0.5 | 0 | 0.2 | 1 | 2 |
| Colorless ink heating step | 60° C., 10 seconds | 60° C., 10 seconds | 60° C., 10 seconds | 60° C., 10 seconds | 60° C., 10 seconds |
| Colorless ink curing step | Performed | Performed | Performed | Performed | Performed |
| Abrasion resistance | 5 | 3 | 3 | 5 | 5 |
| Bending properties | 5 | 3 | 4 | 5 | 5 |
| Chemical resistance | 5 | 3 | 4 | 5 | 5 |
| Adhesiveness | 4 | 3 | 3 | 4 | 4 |
| Image bleeding | 5 | 5 | 5 | 5 | 5 |
| Image dulling | 5 | 5 | 5 | 5 | 5 |
| Banding unevenness | 5 | 5 | 5 | 5 | 3 |

TABLE 17

|  | Example 43 |
|---|---|
| Colored ink jetting step | Ink1A, Ink4A, Ink5A, Ink6A |
| Colored ink heating step | 60° C., 10 seconds |
| Colored ink curing step | Performed |
| Colorless ink jetting step | Top1A |
| Colorless ink heating step | 60° C., 10 seconds |
| Colorless ink curing step | Performed |
| Abrasion resistance | 5 |
| Bending properties | 5 |
| Chemical resistance | 5 |
| Adhesiveness | 4 |
| Image bleeding | 5 |
| Image dulling | 5 |
| Banding unevenness | 5 |

From Table 9 to Table 17, it is understood that the images obtained by the ink jet recording methods in Examples were excellent in abrasion resistance and bending properties.

Since Comparative Example 1 is an image formed by an ink jet recording method without the colored ink heating step, the image is inferior in abrasion resistance. Comparative Example 1 is also inferior in chemical resistance, adhesion, image bleeding, and image dulling.

Since Comparative Example 3 is an image formed by an ink jet recording method without the colorless ink heating step, the image is inferior in abrasion resistance. Comparative Example 3 is also inferior in chemical resistance, adhesion, image bleeding, and image dulling.

Since the colorless ink in Comparative Example 4 is not laminated, abrasion resistance and chemical resistance are inferior.

Since the colorless ink in Comparative Example 6 does not include a polymerizable compound and a photopolymerization initiator, the image that is formed is inferior in abrasion resistance and chemical resistance.

Since the colorless ink in Comparative Example 7 does not include an organic solvent, the image that is formed is inferior in bending properties.

The entire disclosure of JP2015-248004 filed on Dec. 18, 2015 is incorporated herein by reference.

All publications, patent applications, and technical standards mentioned in this specification are herein incorporated by reference to the same extent as if such individual publication, patent application, or technical standard was specifically and individually indicated to be incorporated by reference.

What is claimed is:

1. An ink jet recording method comprising:
    a colored ink jetting step of jetting a colored ink including a coloring agent, a polymerizable compound, a photopolymerization initiator and an organic solvent, from an ink jet head onto a recording medium;
    a colored ink heating step of heating the colored ink jetted onto the recording medium by maintaining a surface temperature of the recording medium at 40° C. or higher;
    a colorless ink jetting step of jetting a colorless ink including a polymerizable compound, a photopolymerization initiator, and an organic solvent from the ink jet head onto the colored ink after the heating;
    a colorless ink heating step of heating the colorless ink jetted onto the colored ink after the heating by maintaining the surface temperature of the recording medium at 40° C. or higher; and
    a colorless ink curing step of curing the colorless ink by irradiating the colorless ink after the heating with an active energy ray,
    wherein the polymerizable compound included in the colored ink includes at least one acrylate compound, and a total mass of a monofunctional acrylate compound and a bifunctional acrylate compound is 50% by mass or higher with respect to a total mass of the polymerizable compound in the colored ink,
    wherein the polymerizable compound included in the colorless ink includes at least one acrylate compound, and a total mass of a monofunctional acrylate compound and a bifunctional acrylate compound is 30% by mass or higher with respect to a total mass of the polymerizable compound in the colorless ink, and
    wherein the colorless ink includes acrylic modified polyorganosiloxane having a weight-average molecular weight of 20,000 to 400,000 in an amount of 0.1% by mass to 5% by mass with respect to a total mass of the colorless ink.

2. The ink jet recording method according to claim 1, wherein the colored ink further includes a polymer having a weight-average molecular weight of 20,000 to 100,000 in an amount of 2% by mass or higher with respect to a total mass of the colored ink.

3. The ink jet recording method according to claim 1, further comprising, after the colored ink heating step and before the colorless ink jetting step:
    a colored ink curing step of curing the colored ink by irradiating the colored ink after the heating with the active energy ray.

4. The ink jet recording method according to claim 3, wherein the colored ink includes, as the polymerizable compound, an acrylate compound having a weight-average molecular weight of 1,000 to 30,000 in an amount of 15% by mass to 30% by mass with respect to a total mass of the colored ink.

5. The ink jet recording method according to claim 1, wherein a content of the organic solvent included in the colorless ink is 50% by mass to 85% by mass with respect to a total mass of the colorless ink.

6. The ink jet recording method according to claim 1, wherein a boiling point of the organic solvent included in the colorless ink is 150° C. to 250° C.

7. The ink jet recording method according to claim 1, wherein a boiling point Tbp (T) of the organic solvent included in the colorless ink and a boiling point Tbp (C) of the organic solvent included in the colored ink satisfy a relationship of Expression (1)

$$\text{Tbp}(C) \leq \text{Tbp}(T) \qquad \text{Expression (1)}.$$

8. The ink jet recording method according to claim 1, wherein surface tension γ (C) of the colored ink and surface tension γ (T) of the colorless ink at a temperature of 25° C. satisfy a relationship of Expression (2)

$$\gamma(T) \leq \gamma(C) \qquad \text{Expression (2)}.$$

9. The ink jet recording method according to claim 1, wherein the heating in the colored ink heating step is performed for one second or longer by maintaining the surface temperature of the recording medium at 40° C. to 100° C.

10. The ink jet recording method according to claim 9, wherein the heating in the colored ink heating step is performed for 5 seconds or longer.

11. An ink jet recording device which performs the ink jet recording method according to claim 1, the device comprising:
    a colored ink jetting portion which jets the colored ink onto the recording medium;
    a colored ink heating portion which heats the colored ink jetted onto the recording medium by maintaining the surface temperature of the recording medium at 40° C. or higher;
    a colorless ink jetting portion which jets the colorless ink onto the colored ink after the heating;
    a colorless ink heating portion which heats the colorless ink jetted onto the colored ink after the heating by maintaining the surface temperature of the recording medium at 40° C. or higher; and
    an irradiation portion for curing a colorless ink which performs irradiation with an active energy ray for curing the colorless ink after the heating.

12. The ink jet recording device according to claim 11, further comprising:
    an irradiation portion for curing a colored ink which performs irradiation with an active energy ray for curing the colored ink after the heating.

* * * * *